US012327036B2

(12) United States Patent
Switzer et al.

(10) Patent No.: US 12,327,036 B2
(45) **Date of Patent: *Jun. 10, 2025**

(54) MANAGING DIGITAL ASSETS STORED AS COMPONENTS AND PACKAGED FILES

(71) Applicant: Adobe Inc., San Jose, CA (US)

(72) Inventors: Stanley J Switzer, San Francisco, CA (US); Roey Horns, Seattle, WA (US); Oliver I Goldman, Seattle, WA (US); Michael Vitrano, New York, NY (US); Julian R Wixson, Portland, OR (US)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/298,652

(22) Filed: Apr. 11, 2023

(65) Prior Publication Data

US 2023/0244404 A1 Aug. 3, 2023

Related U.S. Application Data

(63) Continuation of application No. 15/630,767, filed on Jun. 22, 2017, now Pat. No. 11,635,908.

(51) Int. Cl.
*G06F 3/06* (2006.01)
*G06F 16/10* (2019.01)
(Continued)

(52) U.S. Cl.
CPC ............ *G06F 3/065* (2013.01); *G06F 3/0617* (2013.01); *G06F 3/067* (2013.01);
(Continued)

(58) Field of Classification Search
None
See application file for complete search history.

(56) References Cited

U.S. PATENT DOCUMENTS 8,489,549 B2 7/2013 Guarraci
9,251,151 B1 * 2/2016 Fang .................. G06F 11/1458
(Continued)

FOREIGN PATENT DOCUMENTS

CN 1169628 A 1/1998
CN 101304360 A 11/2008
(Continued)

OTHER PUBLICATIONS

Contrast Enhancement Based On Layered Different Representation of 2D Histograms; Chulwoo Lee; IEEE; vol. 22 No. 12; 2013 pp. 5372-5375.*

(Continued)

*Primary Examiner* — Ann J Lo
*Assistant Examiner* — Jermaine A Mincey
(74) *Attorney, Agent, or Firm* — Keller Preece PLLC

(57) ABSTRACT

The present disclosure relates to a digital asset synchronization system that provides improved digital asset management and synchronization of a digital asset stored either within a component database or a packaged file. For example, the digital asset synchronization system enables a set of components that makes up a digital asset to appear as a singular packaged file, while also maintaining the benefits of having the digital asset made up of the components. In this manner, the digital asset synchronization system provides a bridge between a digital asset stored in a packaged file format and conventional file formats. In addition, the digital asset synchronization system also provides digital asset management and improved synchronization between a client device and a cloud storage system.

20 Claims, 16 Drawing Sheets

1300

Receive A Manifest And A Component Of A Packaged File From The Cloud Storage System 1302

Identify The Received Component Identifier Of The Component 1304

Determine Whether The Received Manifest Creates A Version Conflict 1306

No

Yes

Generate A New Packaged File With The Received Component Based On The Received Manifest 1308

Select The Received Manifest

Resolve The Conflict Between The Multiple Manifest Versions 1312

Select the Existing Manifest

Remove The Received Component From A Local Database 1310

Synchronize The Existing Manifest And Component With The Cloud Storage System 1314

(51) Int. Cl.

| | |
|---|---|
| ***G06F 16/182*** | (2019.01) |
| ***G06F 16/22*** | (2019.01) |
| ***H04L 67/10*** | (2022.01) |
| ***H04L 67/1095*** | (2022.01) |
| *G06F 16/25* | (2019.01) |
| *H04L 67/1097* | (2022.01) |

(52) U.S. Cl.

CPC .......... *G06F 16/1844* (2019.01); *G06F 16/22* (2019.01); *H04L 67/1095* (2013.01); *G06F 16/258* (2019.01); *H04L 67/10* (2013.01); *H04L 67/1097* (2013.01)

(56) References Cited

U.S. PATENT DOCUMENTS

| | | | | |
|---|---|---|---|---|
| 9,542,379 | B1 | 1/2017 | Joshi et al. | |
| 9,727,470 | B1 | 8/2017 | Cande et al. | |
| 11,023,433 | B1 | 6/2021 | Datta et al. | |
| 2001/0031102 | A1* | 10/2001 | Lunetta | G06T 11/60 382/284 |
| 2002/0065691 | A1* | 5/2002 | Twig | H04L 67/306 |
| 2004/0059703 | A1 | 3/2004 | Chappell et al. | |
| 2004/0205539 | A1 | 10/2004 | Mak et al. | |
| 2004/0236798 | A1 | 11/2004 | Srinivasan et al. | |
| 2005/0246387 | A1 | 11/2005 | McChrystal | |
| 2009/0216796 | A1* | 8/2009 | Slik | G06F 16/11 |
| 2009/0276660 | A1 | 11/2009 | Griffith et al. | |
| 2011/0016091 | A1 | 1/2011 | Prahlad et al. | |
| 2011/0047252 | A1 | 2/2011 | Kwapniewski et al. | |
| 2011/0161723 | A1* | 6/2011 | Taleck | G06F 11/1469 714/E11.073 |
| 2012/0236201 | A1 | 9/2012 | Larsen et al. | |
| 2012/0254113 | A1 | 10/2012 | Theroux et al. | |
| 2013/0103786 | A1 | 4/2013 | Miglore | |
| 2013/0226876 | A1 | 8/2013 | Gati et al. | |
| 2013/0262419 | A1 | 10/2013 | Kilian et al. | |
| 2014/0156663 | A1 | 6/2014 | Rhyu et al. | |
| 2014/0280272 | A1 | 9/2014 | Choque et al. | |
| 2014/0281809 | A1 | 9/2014 | Billa et al. | |
| 2015/0113326 | A1 | 4/2015 | Talagala et al. | |
| 2015/0186431 | A1 | 7/2015 | Macchietti et al. | |
| 2015/0227597 | A1 | 8/2015 | Ng et al. | |
| 2015/0358375 | A1 | 12/2015 | Coburn, IV et al. | |
| 2016/0034433 | A1 | 2/2016 | Yamat et al. | |
| 2016/0085769 | A1 | 3/2016 | Penangwala et al. | |
| 2016/0162370 | A1 | 6/2016 | Mehta et al. | |
| 2016/0253352 | A1 | 9/2016 | Kluck et al. | |
| 2016/0267125 | A1 | 9/2016 | Tsofi et al. | |
| 2016/0283049 | A1 | 9/2016 | Faydi et al. | |
| 2016/0328223 | A1 | 11/2016 | Giri et al. | |
| 2016/0344771 | A1 | 11/2016 | Xuan et al. | |
| 2017/0316541 | A1* | 11/2017 | Kim | G09G 5/363 |
| 2017/0322936 | A1 | 11/2017 | Davis | |
| 2018/0129715 | A1 | 5/2018 | Standefer, III et al. | |
| 2018/0332320 | A1 | 11/2018 | Barkley et al. | |
| 2018/0373434 | A1 | 12/2018 | Switzer et al. | |
| 2018/0373770 | A1 | 12/2018 | Switzer et al. | |
| 2019/0266054 | A1 | 8/2019 | Kumarasamy et al. | |
| 2019/0268412 | A1 | 8/2019 | Kung | |
| 2019/0273729 | A1 | 9/2019 | Adler et al. | |
| 2019/0340166 | A1 | 11/2019 | Raman et al. | |

FOREIGN PATENT DOCUMENTS

| | | | |
|---|---|---|---|
| CN | 102770854 | A | 11/2012 |
| CN | 104050216 | A | 9/2014 |
| CN | 104050217 | | 9/2014 |
| CN | 104885076 | A | 9/2015 |
| CN | 106663089 | A | 5/2017 |
| CN | 106686411 | A | 5/2017 |
| CN | 108055131 | A | 5/2018 |
| WO | WO 2014-113196 | A1 | 7/2014 |
| WO | WO 2017-080428 | A1 | 5/2017 |

OTHER PUBLICATIONS

Office Action as received in Chinese application 201810369218.2 dated Oct. 26, 2023.

Examination Report as received in United Kingdom Application GB1806343.8 dated Nov. 1, 2018.

Examination Report as received in United Kingdom Application GB1806343.8 dated May 13, 2020.

Examination Report as received in Australian application 2019213367 dated Oct. 1, 2021.

Examination Report as received in Australian application 2018202510 dated Nov. 2, 2021.

Examination Report as received in Australian application 2018202512 dated Nov. 2, 2021.

Examination Report as received in Australian application 2018202510 dated Jan. 5, 2022.

Notice of Acceptance as received in Australian Application 2018202512 dated Jan. 13, 2022.

Search Report as received in GB1806362.8 dated Nov. 8, 2018.

Combined Search and Examination Report as received in UK application GB1911474.3 dated Jan. 20, 2020.

Intention to Grant as received in UK application GB1806343.8 dated Oct. 14, 2020.

Intention to Grant as received in UK application GB1911474.3 dated Jan. 15, 2021.

L. Lessig, Remix: Making Art and Commerce Thrive in the Hybrid Economy, Penguin Books, Oct. 2008.

About the Licenses, Creative Commons, [online], http://creativecommons.org/licenses/.

I. Jacobs, N. Walsh, "Architecture of the World Wide Web, vol. One", (World Wide Web Consortium), 2004 [online], http://www.w3.org/TR/webarch/.

The JSON Data Interchange Format, Geneva: ECMA International, Oct. 2013.

N. Freed, N. Borenstein, "Multipurpose Internet Mail Extensions (MIME) Part Two: Media Types", 1996 [online], http://tools.ietf.org/html/rfc2046.

M. Nottingham, "Web Linking", 2010 [online], http://tools.ietf.org/html/rfc5988.

T. Berners-Lee, R. Fielding, L. Masinter, "Uniform Resource Identifier (URI): Generic Syntax", 2005 [online], http://tools.ietf.org/html/rfc3986.

Extensible Metadata Platform (XMP) Specification: Part 1, Data Model, Serialization, and Core Properties. Adobe, Apr. 2012.

XMP, Creative Commons Wiki, [online], https://wiki.creativecommons.org/XMP.

Dropbox: Looking Inside the Protocol Behind File Synchronization, Ixia Blog, Aug. 2014 [online], http://blogs.ixiacom.com/ixia-blog/dropbox-looking-inside-the-protocol-behind-file-synchronization/.

Evernote Synchronization via EDAM, Home—Evernote Developers, Jan. 2013 [online], https://dev.evernote.com/media/pdf/edam-sync.pdf.

L. Dusseault, Ed., "HTTP Extensions for Web Distributed Authoring and Versioning (WebDAV)", 2007 [online], http://tools.ietf.org/html/rfc4918.

R. Fielding, J. Gettys, J. Mogul, H. Frystyk, L. Masinter, P. Leach, T. Berners-Lee, "Hypertext Transfer Protocol—HTTP/1.1", 1999 [online], http://tools.ietf.org/html/rfc2616.

S.Chacon, ProGit, Apress, Aug. 2009.

Oracle, Fusion Middleware User's Guide for Oracle Business Rules, 2013 [retrieved from internet Dec. 14, 2020][<URL:https://docs.oracle.com/cd/E 1283901/user.1111/e10228/toc.htnn>] (Year: 2013); Part 1.

Oracle, Fusion Middleware User's Guide for Oracle Business Rules, 2013 [retrieved from internet Dec. 14, 2020][<URL:https://docs.oracle.com/cd/E 1283901/user.1111/e10228/toc.htnn>] (Year: 2013); Part 2.

Goldman, Oliver, et al. "Digital composites: Technology for creativity in a cloud-connected world." 2015 Internet Technologies and Applications (ITA). IEEE, 2015 [retrieved from internet Sep. 17, 2021][<URL:https://ieeexplore.ieee.org/starnp/starnp.jsp?arnurnber 7317385>] (Year: 2015).

(56) References Cited

OTHER PUBLICATIONS

Notice of Grant as received in Australian application 2019213367 dated Feb. 24, 2022.
Klotz M; How good is the map? A multi-scale cross-comparison framework for global settlement layers: Evidence from Central Europe; Elsevier; 2016; p. 191-212 (Year: 2016).
Office Action as received in CN201810368908.6 dated Mar. 1, 2023.
U.S. Appl. No. 15/630,767, filed May 6, 2019, Office Action.
U.S. Appl. No. 15/630,767, filed Nov. 25, 2019, Office Action.
U.S. Appl. No. 15/630,767, filed May 18, 2020, Office Action.
U.S. Appl. No. 15/630,767, filed Oct. 7, 2020, Office Action.
U.S. Appl. No. 15/630,767, filed May 5, 2021, Office Action.
U.S. Appl. No. 15/630,767, filed Nov. 5, 2021, Office Action.
U.S. Appl. No. 15/630,767, filed May 18, 2022, Office Action.
U.S. Appl. No. 15/630,767, filed Dec. 23, 2022, Notice of Allowance.
U.S. Appl. No. 15/630,740, filed Sep. 26, 2019, Preinterview 1st Office Action.
U.S. Appl. No. 15/630,740, filed Feb. 5, 2020, Office Action.
U.S. Appl. No. 15/630,740, filed Jun. 18, 2020, Office Action.
U.S. Appl. No. 15/630,740, filed Nov. 30, 2020, Notice of Allowance.
U.S. Appl. No. 16/291,677, filed Mar. 20, 2020, Preinterview 1st Office Action.
U.S. Appl. No. 16/291,677, filed May 28, 2020, Office Action.
U.S. Appl. No. 16/291,677, filed Aug. 18, 2020, Office Action.
U.S. Appl. No. 16/291,677, filed Dec. 18, 2020, Office Action.
U.S. Appl. No. 16/291,677, filed May 11, 2021, Office Action.
U.S. Appl. No. 16/291,677, filed Oct. 12, 2021, Office Action.
U.S. Appl. No. 16/291,677, filed Dec. 24, 2021, Notice of Allowance.
U.S. Appl. No. 17/188,905, filed Nov. 10, 2022, Office Action.
U.S. Appl. No. 17/188,905, filed Jan. 30, 2023, Notice of Allowance.
Office Action as received in Chinese application 201810369218.2 dated Apr. 8, 2023.
Office Action as received in Chinese application 201810368908.6 dated Nov. 30, 2023.
Office Action as received in CN Application No. 201910683766.7 dated Feb. 1, 2024.
Notice of Allowance and Search Report received in CN application No. 201801369218.2 dated Feb. 21, 2024.
U.S. Appl. No. 18/309,439, filed Dec. 13, 2023, Notice of Allowance.

* cited by examiner

MANAGING DIGITAL ASSETS STORED AS COMPONENTS AND PACKAGED FILES

CROSS-REFERENCE TO RELATED APPLICATIONS

The present application is a continuation of U.S. application Ser. No. 15/630,767, filed on Jun. 22, 2017. The aforementioned application is hereby incorporated by reference in its entirety.

BACKGROUND

The advent of computers and computer technologies has provided numerous benefits. Some of these benefits include the ability for an individual to access files among various computing devices that the individual uses. For example, various file management systems enable an individual, or a group of individuals, to synchronize files across multiple client devices as well as access their files on the cloud (e.g., via the Internet). Despite these and other advantages, conventional file management systems, however, still present several drawbacks.

To demonstrate some drawbacks, some conventional file management systems enable an individual to synchronize files between a computing device and a remote server. Any time a change to a file occurs, however, some conventional file management systems resynchronize the entire modified file. For example, if a user performs a minor change to a large file, some conventional file management systems resynchronize the entire file. Likewise, anytime a change to a file is detected on the remote server, the computing device downloads a full copy of the modified file, which results in an inefficient use of bandwidth and memory resources. Further, when additional devices synchronize the file, this problem further compounds as the file management system then transmits a full copy of the file to each device.

As another example drawback, conventional file management systems often limit the ability of multiple devices or applications to simultaneously access a file, particularly when concurrent edits are being performed. For example, conventional file management systems often prevent modification of a file at by one device/application if the file is also being accessed by another device/application. In particular, some conventional file management systems limit read-write access to one device/application and allow other devices read-only access.

As a further drawback, many conventional file management systems provide poor conflict resolution between multiple versions of the same file. For example, when different versions of the same file exist, conventional file management systems often create full duplicates of the file. Not only does creating a full duplicate of the file require additional memory resources, these multiple copies of the file often create conflicts. For instance, an individual is left on their own to figure out which copies contain which modifications, whether to merge modifications between multiple copies, and/or whether to delete one or more copies as a duplicate or outdated version. In addition, these file copies clutter up devices (e.g., multiple copies of the same file begin to appear in folders and directories). As a result, individuals are confused as to what to do with each file copy, and in some cases, incorrectly remove a file that includes correct revisions.

Accordingly, these along with additional problems and issues exist with regard to conventional file management systems. Hence, there remains a need for an improvement in the area of file management within a computing device as well as between computing devices.

BRIEF SUMMARY

One or more embodiments of the present disclosure include systems and methods that provide improved digital asset management and synchronization between a digital asset stored either within a component database or a packaged file. In particular, in one or more embodiments, the systems and methods manage digital assets by separating each digital asset (a digital image, file, etc.) into intrinsic components that make up the digital asset (layers, pages, etc.) and storing the components as separate individual files. A component includes content within a defined boundary of a digital asset and is modifiable without affecting other components of the digital asset, such as a layer of an image or a page of a document. Component-based management of digital assets allows the methods and systems to store and synchronize the components individually rather than entire digital assets when changes are made to the digital assets.

Furthermore, the systems and methods enable a set of components that makes up a digital asset to appear to a user as a single file, called a packaged file. In this manner, the systems and methods improve a user's experience by presenting a digital asset as a single packaged file, while also capitalizing on the benefits provided by storing and synchronizing individual components within the packaged file. Further, the systems and methods provide digital asset management and improved synchronization between a client device and a cloud storage system.

To briefly demonstrate, the disclosed systems and methods maintain a component database on a client device where the component database stores components and a manifest for each digital asset. In particular, each of the manifests in the component database indicates which components in the component database make up a digital asset. Further, the component database stores the components as independent files distributed across the component database and/or computing device. Additionally, each digital asset has a mapping that indicates where each component of the digital asset is located within the component database and/or if the components are included within a packaged file.

In addition, the systems and methods generate a packaged file of a digital asset. Specifically, the systems and methods copy each component belonging to the digital asset from the component database. The systems and methods then package the component copies into a packaged file. Upon generating the packaged file, the systems and methods update the mapping (e.g., path) for each component in the digital asset to reference the packaged file rather than files stored in the component database. After updating the digital asset mapping to reference the location of the packaged file, the systems and methods can remove the corresponding components stored in the component database to eliminate duplicative copies of the components.

In some embodiments, the disclosed systems and methods detect a modification to a component of a digital asset. For example, a cloud storage system or application on a client device provides a notification regarding modifications to one or more components of the digital asset. Upon detecting the modification to a component, the systems and methods create or store an updated copy of the component (i.e., a separate file) in the component database that includes the modifications to the component.

Further, the systems and methods replace the component with the updated copy of the component in the manifest for the digital asset (e.g., create a new manifest that identifies the updated copy of the component being associated with the digital asset) as well as generate a modified packaged file that includes the updated copy of the component. In addition, the systems and methods update the mapping of the digital asset to indicate that the updated copy of the component is stored in the modified packaged file. After updating the mapping and generating the modified packaged file, the systems and methods can optionally remove the copy of the component from the component database. In some embodiments, the systems and methods synchronize the component and copy of the component with the cloud storage system before removing those files from the component database.

These and additional features and advantages of one or more embodiments of the present disclosure are outlined in the description which follows, and in part will be obvious from the description, or may be learned by the practice of such example embodiments.

BRIEF DESCRIPTION OF THE DRAWINGS

The disclosure describes one or more embodiments with additional specificity and detail through the use of the accompanying drawings, as briefly described below.

DETAILED DESCRIPTION

Figure 1:
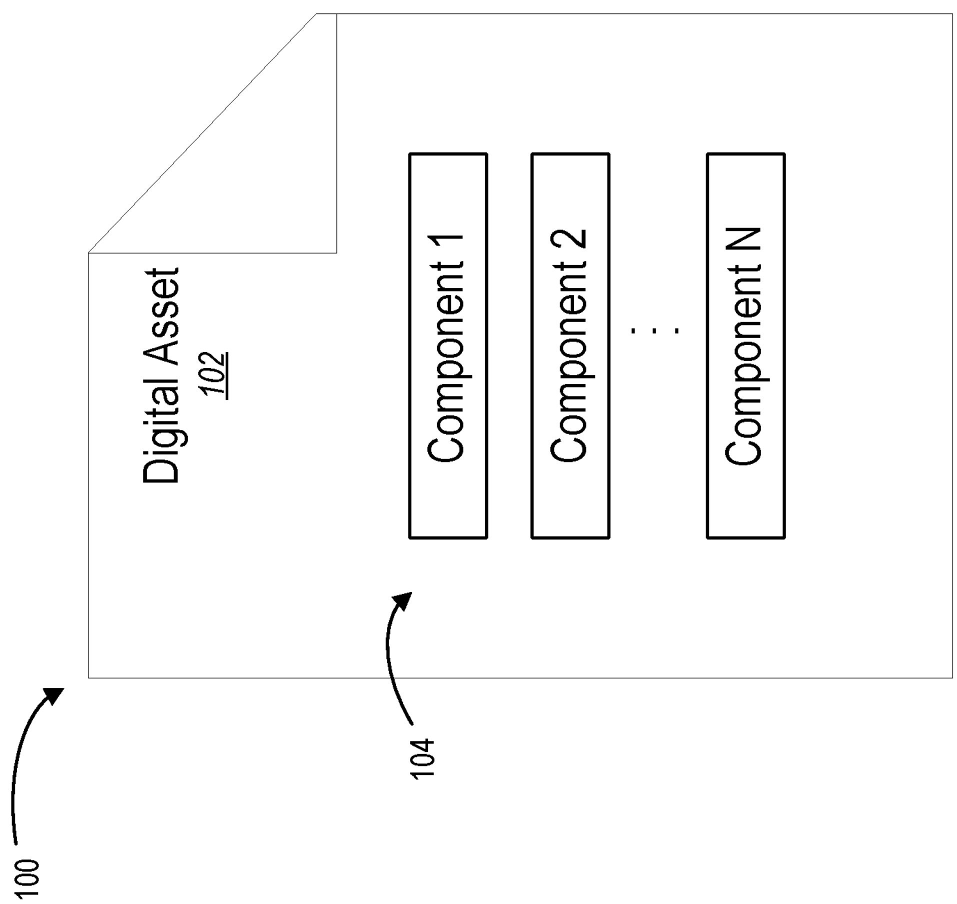
FIG. 1 illustrates an exemplary packaged file of a digital asset that is made up of multiple components in accordance with one or more embodiments.

One or more embodiments of the present disclosure include a digital asset synchronization system that provides improved local and remote synchronization of digital assets. In particular, the digital asset synchronization system manages digital assets by separating each digital asset into its intrinsic components and managing/synchronizing the components individually rather that the entire digital assets. To demonstrate, in one or more embodiments, the digital asset synchronization system identifies components of a digital asset. Upon identifying the components of a digital asset, the digital asset synchronization system assigns identifiers that uniquely identify each component. The digital asset synchronization system stores each of the components of the digital asset as an independent file in a component database rather than as a monolithic file. When a component is modified, the digital asset synchronization system, stores an updated version of the component and syncs the updated version of the component.

Further, the digital asset synchronization system enables a set of components that makes up a digital asset to appear as a singular packaged file, while also maintaining the benefits of managing and synchronizing the components rather than the entire file. In this manner, the digital asset synchronization system provides a bridge between the individually managed and synchronized components that make up a digital asset and conventional file formats and surfacing of files.

To demonstrate, in one or more embodiments, the digital asset synchronization system maintains a component database on a client device where the component database stores components and one or more manifests for a digital asset. Each manifest indicates a set of components that make up a digital asset. In addition, each manifest is associated with a mapping that indicates where the component is located in the component database or elsewhere on the client device (e.g., in a packaged file). In this manner, the component database indicates which components in the component database make up the digital asset and where the components are located. Further, the component database stores the components as independent files distributed across the component database and/or computing device.

Based on the components of a digital asset stored in the component database, in one or more embodiments, the digital asset synchronization system generates a packaged file of the digital asset. Specifically, the digital asset synchronization system copies each component belonging to the digital asset from the component database. The digital asset synchronization system then packages the component copies into a packaged file (e.g., an ADOBE® CREATIVE CLOUD® package ("CCP"), a zip file, PDF file, another compressed file format, or another packaged file format). Upon generating the packaged file, the digital asset synchronization system updates the mapping for each component the digital asset to reference the packaged file rather than the component database. After updating the mapping for each component, the digital asset synchronization system removes the components stored in the component database to eliminate duplicative copies of the components on the client device.

The digital asset synchronization system, in some embodiments, also synchronizes components of the digital asset before removing them from the component database. For example, before removing the components of the digital asset from the component database, the digital asset synchronization system synchronizes the components to a cloud storage system. In this manner, if a packaging error occurs, such as a component going missing or becoming corrupt, the digital asset synchronization system can retrieve the absent or corrupt component from the cloud storage system and repackage the digital asset into a packaged file.

Additionally, the digital asset synchronization system can detect a modification to a component of a digital asset. For example, a cloud storage system indicates to the digital asset synchronization system on the client device that a component has been updated. As another example, an application or an operating system process on the client device provides a notification to the digital asset synchronization system regarding one or more updated components of a digital asset. Upon detecting the modification to a component, the digital asset synchronization system creates or stores an updated copy of the component (i.e., a separate file) within the component database that includes the modified component.

Further, the digital asset synchronization system updates the manifest of a digital asset by replacing the old component (e.g., an identifier associated with the component) with the updated component (e.g., an identifier associated with the updated component copy). In addition, the digital asset synchronization system generates a modified packaged file that includes the updated component copy, either by appending the updated component copy to the original packaged file or by generating a new packaged file with the updated component copy in place of the component. Also, the digital asset synchronization system updates the mapping to reference the updated component copy in the new packaged file rather than the component database. After updating the mapping and generating the modified packaged file, the digital asset synchronization system removes the component copy (and the component) from the component database. As mentioned above, in some embodiments, the digital asset synchronization system synchronizes the component and copy of the component with the cloud storage system before removing those components from the component database.

In some embodiments, the digital asset synchronization system maintains previous versions of one or more digital assets. For example, the component database stores manifests corresponding to previous versions of a digital asset. Further, the component database and/or the cloud storage system can store manifests of a digital asset that indicate components used in the previous digital asset versions. When the digital asset synchronization system tracks versions of a digital asset, the digital asset synchronization system can ensure that the packaged file represents the most current version of a digital asset. In this manner, if a user moves or copies the packaged file to a location outside of the digital asset synchronization system, such as emails the packaged file to another user, the digital asset synchronization system ensures that the user is working with the most current version of the digital asset.

When synchronizing components with the cloud storage system, the digital asset synchronization system need only to synchronize a new or updated component of a digital asset with the cloud storage system as opposed to each component that makes up the digital asset. In other words, the digital asset synchronization system need only synchronize a small portion of a digital asset when the digital asset is updated or modified. Further, because packaged files are comprised of components, the digital asset synchronization system employs these same bandwidth saving techniques when synchronizing an updated digital asset represented as a packaged file.

As mentioned above, in some cases a user moves a packaged file outside of the digital asset synchronization system. Similarly, in various embodiments, a user moves a packaged file into the digital asset synchronization system. As an overview, the digital asset synchronization system maintains a monitored file directory (e.g., a folder) that includes one or more subdirectories (e.g., folders within folders) on a client device. The digital asset synchronization system synchronizes each file within the monitored directory with the cloud storage system. In addition, the digital asset synchronization system monitors each file within the monitored file directory to detect when a component changes (e.g., either within a packaged file or the component database). Accordingly, as described further below, the digital asset synchronization system can detach (e.g., stop monitoring) a packaged file when the file is moved outside the monitored file directory and attach or reattach a packaged file that is moved into the monitored file directory.

In additional embodiments, the digital asset synchronization system provides intelligent conflict resolution when conflicts arise with respect to a digital asset. As described further below, when the digital asset synchronization system detects a conflict between different versions of a digital asset based on comparing the manifests corresponding to each version, the digital asset synchronization system can identify and incorporate components in a previous manifest that are missing from a more recent manifest for the digital asset. Further, when the digital asset synchronization system detects a conflict between different versions the same component of a digital asset (e.g., between a component branch and cloud branch), the digital asset synchronization system can include both versions of the component in the digital asset. In this manner, the digital asset synchronization system enables a user to quickly recognize and correct the conflict within the digital asset.

As briefly described above, the digital asset synchronization system provides a number of advantages over conventional file management systems. For example, the digital asset synchronization system provides increased flexibly to a client device by creating a bridge between digital assets represented by components in a component database and packaged files, which appear to a user as a monolithic file, but which provides faster access and presentation by a client device.

To demonstrate, because packaged files are made up of components, the digital asset synchronization system can utilize the efficiencies gained by synchronizing only modified components of a digital asset rather than synchronizing the entire digital asset. As detailed herein, the digital asset synchronization system provides improved efficiencies to a client device by reducing the computing resources needed by the client device to synchronize and store digital asset. Further, by employing digital assets stored as components, either in a component database or a packaged file, the digital asset synchronization system provides faster access to (e.g., faster search) and presentation of the digital asset, which results in the digital asset synchronization system improving the functionality of the client device itself (e.g., the digital asset synchronization system accesses, displays, and edits digital assets faster than conventional systems and methods).

As an additional advantage, the digital asset synchronization system provides increased flexibility and improved computing functionality by enabling simultaneous access and editing of the same digital asset by multiple users, applications, and/or devices. When the digital asset synchronization system detects a change in one component of a digital asset, the digital asset synchronization system automatically propagates the change to other users, applications, and/or devices simultaneously accessing the digital asset. Conventional systems and methods do not enable simultaneous access and editing of the same digital asset by multiple users, applications, and/or devices. Furthermore, when a conflict with a component is detected, the digital asset synchronization system intelligently resolves the conflict as mentioned above.

Moreover, as a result of the digital asset synchronization system providing simultaneous access to components between applications on a client device, the individual applications do not need to provide inter-process communications (IPC) when a component changes within the application. Rather, the digital asset synchronization system detects, manages, and coordinates the modified component across multiple applications. This feature is particularly relevant in sandboxed systems and similar environments, where applications are prevented from using IPC to communication with other applications on a client device. Additional benefits, advantages, features, and characteristics of the digital asset synchronization system are described below with respect to the figures, which describe one or more embodiments of the digital asset synchronization system.

Referring now to the Figures, FIG. 1 illustrates an exemplary packaged file 100 of a digital asset 102. As shown, the packaged file 100 includes multiple components 104 that make up the digital asset 102. In some embodiments, thousands of components 104 make up a digital asset 102. The digital asset synchronization system can also generate a manifest that lists each component that makes up the digital asset 102. By employing the packaged file, the digital asset synchronization system causes the digital asset 102 to appear as a single monolithic file rather than a collection of components 104 that make up the digital asset 102. In other words, a client device displays the digital asset 102 as a single file, which a user can select, open, move, copy, etc., without the user perceiving that the digital asset 102 is a collection multiple components files.

For the sake of clarity, the term "digital asset," as used herein, generally refers to digital data having a corresponding right to use. For instance, a user is authorized to create, view, modify, and/or delete a digital asset. Examples of a digital asset, include but are not limited to, documents such as word documents, spreadsheets, and presentations; electronic messages; images such as illustrations, animations, and photographs; videos; audio content; three-dimensional data; and other digital data that a user can transmit between computing devices.

The term "component" refers to a portion of a digital asset. A particular set or collection of components makes up a digital asset (e.g., a digital asset version). In general, each component of a digital asset is modifiable without affecting other components of the digital asset. As such, one file can be accessed, modified, transmitted, and/or removed separately from other data files. Because components are discrete portions of a digital asset, each component can be stored on a computing device as an individual file, in a file location or directory that is not dependent on where other components of the digital asset are stored. Thus, in contrast to a monolithic file, which stores all data belonging to the file in a single location, components of a digital asset can be stored as files distributed across a storage medium, such as on one or more client devices and/or remote server devices. In some instances, however, a limited number of components are linked, and changes to one component affect a limited number of other components. In addition, the style (e.g., framework) of a component is based on boundaries within a digital asset and is often based on the digital asset's type. For example, an image includes layers and sub-layers as components; a video or video project includes shorter video segments, titles, and static graphics as components; a document includes pages, canvases, artboards, text and image boxes, rows, columns, and/or graphics as components; and a three-dimensional model includes meshes, maps, scenes, and skins as components. In other cases, a user can define the boundaries/parameters for components of a digital asset.

In addition, each component, at one time or another, is an independent file. As used herein, the term "independent file" (or simply "file") generally refers to digital data individually recorded in a storage medium. As such, one file can be accessed, modified, transmitted, and/or removed separately from other data files. Because components are discrete portions of a digital asset, each component can be stored on a computing device as an individual file, in a file location or directory that is not dependent on where other components of the digital asset are stored. As such, components of a digital asset can be stored as files distributed across a storage medium, such as on one or more client devices and/or remote server devices.

In some embodiments, as described herein, multiple components are stored together in a packaged file. As used herein, the term "packaged file" generally refers to a collection of components that make up a digital asset and that depict the digital asset as a single monolithic file. Generally, the collection of components of the digital asset is grouped within the single file depicting the digital asset.

Moreover, a packaged file can include compressed or archived components of a digital asset. For example, a packaged file is an ADOBE® CREATIVE CLOUD® package ("ccp"), a zip file or a PDF (Portable Document Format) file. In addition, in various embodiments, a packaged file is associated with a particular file type indicated by a particular file extension. Further, a packaged file can include components of a digital asset that represent the most current version of the digital asset. In some instances, however, the packaged file also includes components belonging to one or more previous versions of the digital asset. The term "packaged file" can be synonymous with the terms "packaged component file," "snapshot," "snapshot file," "component snapshot," "digital asset snapshot," "head version," "file representation," "singular view file" "composite file" and "composite."

Returning to FIG. 1, as mentioned above, the packaged file 100 depicts the digital asset 102 as a monolithic file rather than a collection of the components 104 stored as independent files. In this manner, a client device displays the digital asset 102 as a single file within a file directory. Further, representing the digital asset 102 as the packaged file 100 enables a user may move and/or copy the digital asset 102 from one directory of a client device to another directory or to another component device (a server device or other client device). As such, the packaged file 100 provides a user with a familiarized experience of working with conventional files (i.e., single monolithic files not having components). Specifically, one or more embodiments generate a packaged file 100 from component files that a computing system (e.g., WINDOWS EXPLORER, FINDER, NAUTILUS, DOLPHIN, XFE, or THUNAR), while still providing the benefits of managing and synchronizing the individual component.

Despite the digital asset 102 appearing as a singular monolithic file, the packaged file 100 preserves the benefits provided by using components to make up a digital asset, which conventional files lack. As one example, components enable multiple users, client devices, and/or applications to access a digital asset simultaneously. As another example, components enable the digital asset synchronization system to efficiently synchronize small portions of a digital asset between a client device and a cloud storage system or between multiple client devices. In addition, components enable the digital asset synchronization system to maintain multiple versions of a digital asset without needing to store full copies of each version. These and other benefits of employing components for a digital asset are described further below in connection with the following figures.

Figure 2:
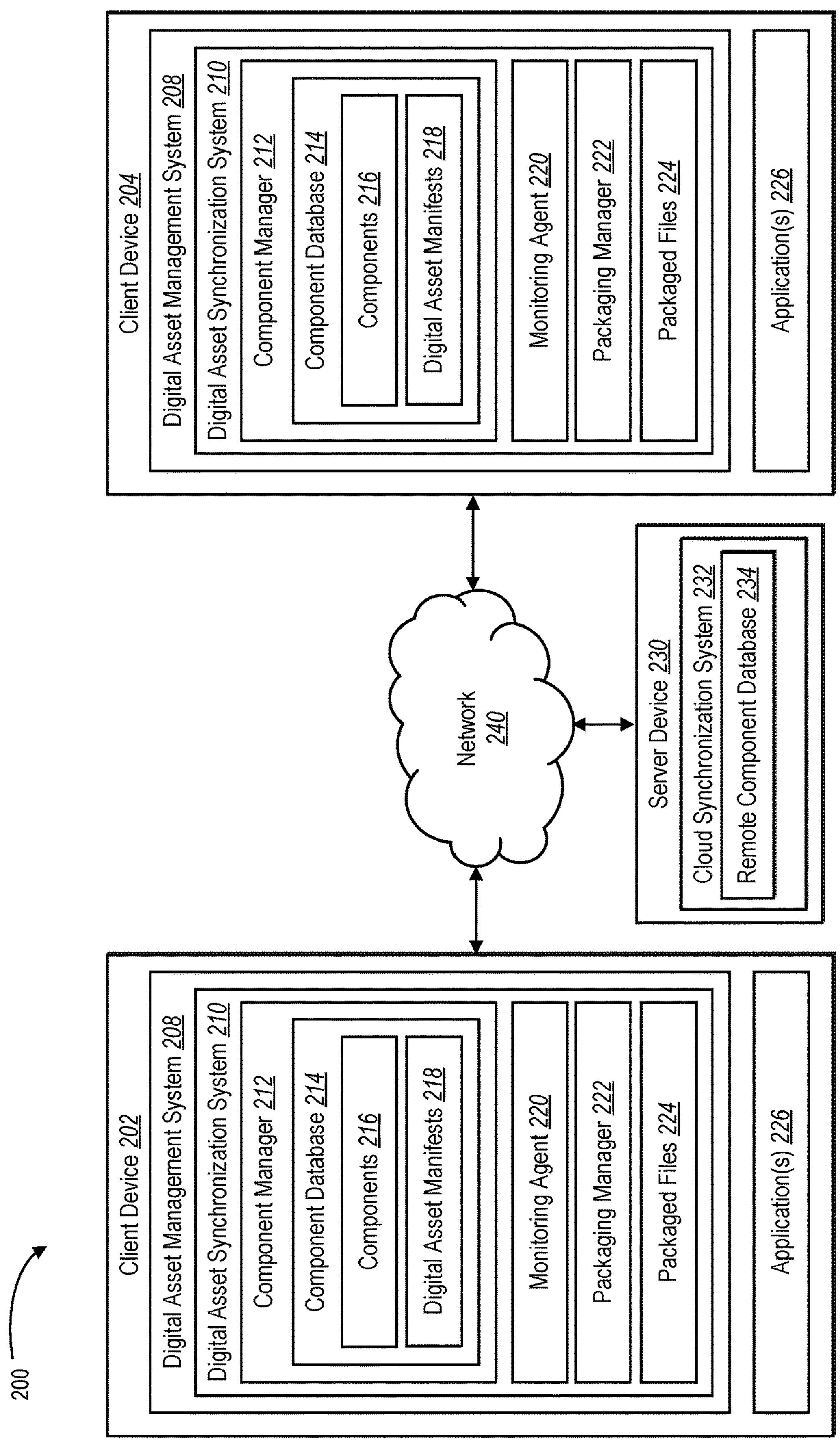
FIG. 2 illustrates a block diagram of an environment in which a digital asset synchronization system can operate in accordance with one or more embodiments.

FIG. 2 illustrates a block diagram of an environment 200 in which a digital asset management system 208 having a digital asset synchronization system 210 can operate in accordance with one or more embodiments. As shown in FIG. 2, the environment 200 includes two client devices (e.g., a first client device 202 and a second client device 204) that communicate with a server device 230 via a network 240. One will appreciate that the environment 200 can be arranged in various configurations and include more or fewer elements. For example, the environment 200 can include any number of client devices. One or more computing devices (e.g., a client device and/or a server device) can implement the digital asset management system.

Each of the client devices shown in FIG. 2 includes the digital asset management system 208 and one or more applications 226. For ease of explanation, the elements of the digital asset management system 208 and the one or more application 226 are described with respect to the first client device 202. One will appreciate, however, that the elements of the digital asset management system 208 and the one or more application 226 perform similar functions on the second client device 204 as well as other client devices not shown.

In general, the client devices may each represent various types of client devices. For example, in some embodiments, the first client device 202 and/or the second client device 204 is a mobile device, such as a mobile telephone, a smartphone, a PDA, a tablet, a laptop, a wearable device, etc. In other embodiments, the first client device 202 and/or the second client device 204 is a non-mobile device, such as a desktop or server, or another type of client device. Additional details with respect to the client devices are discussed below with respect to FIG. 16.

The digital asset management system 208 and the digital asset synchronization system 210 can comprise computer-executable instructions that, when executed by one or more computing devices cause the corresponding one or more computing device to perform a number of actions, as discussed in more detail below. Furthermore, in one or more embodiments, the digital asset management system 208 provides digital composite (or component) technology (referred to as "DCX"), which facilitates the framework for the creation of component sets (i.e., packaged files) as described herein. Accordingly, much of the below description regarding the digital asset management system 208 is in relation to providing DCX.

As illustrated in FIG. 2, the digital asset management system 208 on the first client device 202 include a synchronization system 210 having a component manager 212, a monitoring agent 220, a packaging manager 222, and packaged files 224. The component manager 212 further includes a component database 214 (e.g., a synchronizing repository) that stores components 216 of digital assets and corresponding digital asset manifests 218. One will appreciate that the digital asset management system 208 can include additional or fewer elements that perform the functions further described below.

To provide context, the digital asset management system 208 and the digital asset synchronization system 210 maintain (at least) two categories of a digital asset. The first category includes digital assets whose components are stored in the component database 214. The second category includes digital assets whose components are often stored in the packaged files 224. In addition, the digital asset synchronization system can also store digital assets that are conventional monolithic files, which do not include components.

In general, the first category of digital assets is managed by the component manager 212 while the second category of digital assets is managed by the monitoring agent 220 (e.g., a core synchronizing agent) and the packaging manager 222. However, while managing the packaged files 224, communication and overlap often occurs between the component manager 212, monitoring agent 220, and the packaging manager 222.

In addition, a client device displays icons (or other graphical file representations) of the packaged files 224 within a file directory (e.g., a monitored file directory). In contrast, non-packaged files are largely visible only through an application interface. For example, an application presents a list of digital assets that are stored in the component database, but not directly found in a file directory. Additional detail with respect to each category of digital assets is now provided.

The component manager 212, in general, facilitates the storage, access, and synchronization of a digital asset stored as components within the component database 214. For example, the component manager 212 stores components 216 of a digital asset as independent files distributed across the component database 214. In addition, the component manager 212 creates one or more digital asset manifests 218 that each associate one or more versions of the digital asset to the components 216. As such, when a digital asset is stored in the component database 214, the digital asset is typically not represented as a singular file within a file directory but as independent component files. However, when a user views the digital asset within an application, the component manager 212 enables the application to display the digital asset as a single monolithic file, as further described below.

As mentioned above, the component manager 212 generates, stores, and modifies the digital asset manifests 218 (or simply "manifests 218) of one or more digital assets. In particular, each of the manifests 218 includes a listing of the components 216 that make up a digital asset. In some embodiments, a manifest defines an order, priority, or arrangement of components of the digital asset, as described below. For example, a manifest for a digital image (i.e., a digital asset) indicates layers (i.e., components) that make up the digital image. Further, the manifest identifies the order and/or priority of each layer within the digital image.

Each of the manifests 218 for a digital asset can include an identifier (i.e., "ID") and, in some cases, a mapping (e.g., path). In general, an identifier uniquely labels each component that makes up a digital asset. The component manager 212 uses component identifiers to list the components that make up a digital asset in a manifest. The mapping indicates a database location and/or file path of a packaged file where a component is being stored. In some embodiments, the component manager 212 stores the mapping for each digital asset in the component database 214. As mentioned above, components are stored as independent files distributed across a storage medium, such as the component database 214 or elsewhere on the first client device 202.

As just mentioned, in some embodiments, the component database 214 maintains a mapping that indicates when a component is stored in a packaged file rather than in the component database 214. These embodiments are described below. In other embodiments, a mapping indicates that a component is stored in the cloud synchronization system 232. For example, the component database 214 maintains a previous manifest of a digital asset and that includes one or more obsolete components. Rather than storing the obsolete components on in the component database 214, the component manager 212 synchronizes the components with the cloud synchronization system 232 before removing the components from the component database 214 and/or the first client device 202. Further, the component manager 212 updates a mapping to indicate that the obsolete components are store on the component manager 232.

As mentioned above, the component manager 212 can keep version histories of a digital asset based on storing manifests of previous versions of a digital asset. To demonstrate by way of example, suppose a digital asset includes three components. The component manager 212 creates a manifest that identifies the three components and their corresponding mapping. This manifest represents Version 1 of the digital asset. Upon receiving an update to the first component of the digital asset, the component manager 212 generates an updated manifest that replaces the identifier/mapping with the original first component with the identifier/mapping of the updated first component that corresponds to a newly created file, which includes the first component in its updated form, and which is separately stored in the component database 214. The updated manifest represents Version 2 of the digital asset.

In this example, the component manager 212 maintains multiple versions of the digital asset by storing only one additional component for the digital asset (e.g., the original three components and the updated first component). If a user desires to view Version 1 of the digital asset, the component manager 212 accesses the original three components using the original manifest and corresponding mapping. If the user desires to view Version 2 of the digital asset, the component manager 212 uses the updated manifest and corresponding mapping to access the updated first component along with the original second component and the original third component.

In some embodiments, the component manager 212 removes previous components from the component database 214 and/or the first client device 202 to free up memory space on the first client device 202. For example, the component manager 212 deletes the original first component from the component database 214. Before removing the original first component, however, the component manager 212 ensures that a backup copy of the original first component is stored in the cloud synchronization system 232. For instance, the component manager 212 ensures that the original first component is synchronized with the cloud storage system before removing the original first component from the component database 214.

While the component manager 212 removes previous components from a client device, as described in the above embodiments, the component manager 212 can maintain, on the first client device 202, a number of manifests 218 corresponding to previous versions of a digital asset. The manifests 218 for a digital asset are generally smaller text files (or database entries) that require little memory to store. Additionally, and/or alternatively, the component manager 212 provides copies of each manifest for previous versions a digital asset to the cloud synchronization system 232 to store. In some embodiments, the component database 214 maintains a limited number of previous version manifests for a digital asset while the cloud synchronization system 232 stores a larger number of previous version manifests for the digital as set.

In one or more embodiments, the component manager 212 uses a manifest that includes each previous component used in a digital asset. To demonstrate, from the example above, the updated manifest includes an additional field that lists the original first component as a previous version of the updated first component. In this manner, a user can request that the component manager 212 revert a specific component back to a previous version, while leaving the other components in the digital asset unaffected.

The component manager 212 as mentioned above, facilitates synchronization with the cloud synchronization system 232. Specifically, upon creation of a digital asset or individual components, the component manager 212 ensures that each component is stored in the cloud synchronization system 232. In addition, the component manager 212 can provide transactional guarantees, such as receiving verification that each component has been successfully received by the cloud synchronization system 232. Further, after the component manager 212 on the first client device 202 uploads components of a digital asset with the cloud storage system 232, the component manager 212 on the second client device 204 downloads the components of the digital asset with from cloud storage system 232.

After initially synchronizing a digital asset, the component manager 212 need only synchronize individual components as they are modified. From the example above, upon the first component updating, the component manager 212 provides (e.g., pushes) only the updated first component to the cloud synchronization system 232 (and, in some cases, the updated manifest that represents Version 2 of the digital asset). In this manner, the component manager 212 need not redundantly upload the entire digital asset to the cloud synchronization system 232.

Likewise, if the cloud synchronization system 232 indicates to the component manager 212 on the first client device 202 that a component has updated (e.g., been modified, added, or deleted), the component manager 212 communicates with the cloud synchronization system 232 to download the updated component. For instance, from the above example, the component manager 212 detects that a fourth component is added to the digital asset on the cloud synchronization system 232. As such, the component manager 212 requests (e.g., pulls) the component from the cloud synchronization system 232, and updates the manifest of the digital asset to reflect the update on the first client device 202. As one will appreciate, the component manager 212 can synchronize multiple components for one or more digital assets with the cloud synchronization system 232 in parallel.

In some instances, conflicts arise between components of a digital asset. For example, when performing parallel synchronizations with the cloud synchronization system 232, the component manager 212 can detect conflicts between branches (e.g., manifests) of the digital asset. As an overview, branches represent a version of a digital asset located on a particular device, which that particular device considers is the correct version. For example, a digital asset may have a cloud branch, a first client device branch, a second client device branch, and a verified synchronized branch. As an additional example, the same client device can have a base branch, a first application branch, and a second application branch. Because the digital asset management system 208 and the digital asset synchronization system 210 allow for access to a digital asset from various devices as well as concurrent access from the same client device, conflicts between components of a digital asset can result.

Further, as a note, the conflict resolution principles described below can be pluggable, meaning that the digital asset synchronization system 210 can optionally apply one or more of the embodiments provided below. Alternatively, the digital asset synchronization system 210 can employ different embodiments of conflict resolution than those described. In some embodiments, the digital asset synchronization system 210 employs a different type of conflict resolution based on the format type or file type of a packaged file. For example, the digital asset synchronization system 210 applies a different conflict resolution to a packaged image file than to a packaged document file.

When a conflict between components in different branches of a digital asset arise, the component manager 212 can also employ one or more methods and/or techniques to resolve the conflict. In general, when a conflict arises between different versions of the same digital asset, the conflict is between different components of the digital asset, as digital assets are often made up of a large number of components. As such, the component manager 212 can reconcile the conflicts by merging the most updated versions of each component into a single version of the digital asset, then synchronizing the updated version with the cloud synchronization system 232.

To demonstrate using a new example, suppose a digital image (i.e., a digital asset) includes 50 layers (e.g., components). Initially, the first client device 202 and the cloud synchronization system 232 each have a verified synchronized version (i.e., a matching version) of the digital image. After updating the first layer of the digital image, the component manager 212 attempts to synchronize the local-updated version with the cloud synchronization system 232. However, while performing the synchronization, the component manager 212 detects that the cloud synchronization system 232 has a cloud-updated version where the tenth layer is modified (e.g., the second client device 204 updated and uploaded the now cloud-updated version) with the first layer remaining unchanged from the verified synchronized version.

To resolve this conflict, in one or more embodiments, the component manager 212 first receives the cloud-updated version of the digital asset, which includes downloading only the modified component (i.e., the updated tenth layer). Next, the component manager 212 determines that the conflict between the local-updated version and the cloud-updated version are due to different components being updated. As such, the component manager 212 merges the updated component from the cloud-updated version (e.g., the updated tenth layer) into the local-updated version, which is now the most current version of the digital asset.

Further, the component manager 212 sends the updated first layer to the cloud synchronization system 232 such that the cloud synchronization system 232 has the most current version of the digital asset. Stated differently, because the cloud-updated version included the updated tenth layer, but lacked the updated first layer, the component manager 212 need only send the updated first layer to the cloud synchronization system 232 (along with an updated manifest that included reference to the updated first and tenth layers). Upon sending the updated first paragraph, the component manager 212 can communicate with the cloud synchronization system 232 to ensure that the local version of the digital asset matches the cloud version of the digital asset, which then becomes the new verified synchronized version. One will appreciate that the same principles and techniques apply to resolving conflicts between two versions of a digital asset on the same client device.

Rather than merging the most recent components from different unsynchronized versions of a digital asset, in alternative embodiments, the component manager 212 elects to use the most recent version of the digital asset, based on when the updates to each version of the digital asset occurred. In another instance, the component manager 212 adds a copy of a conflicting component to the local version. For instance, from the above example, the component manager 212 adds the updated tenth layer before or after the original tenth layer (as further described below). In further embodiments, the component manager 212 creates separates copies of the digital asset (i.e., separate packaged files), each having a version of the tenth layer.

In some instances, however, a conflict arises between different versions of the same component of a digital asset. In these instances, the component manager 212 employs intelligent techniques and methods to resolve the conflict. In one or more embodiments, the component manager 212 resolves the conflict by creating one or more additional components that include the conflicting modifications.

To demonstrate using anther example, suppose a digital PDF document (i.e., a digital asset) has five pages (e.g., components) and is being accessed simultaneously by two applications 226, either locally or remotely. Upon the component manager 212 detecting a change to page three by a first application (e.g., a "first-updated page three"), the component manager 212 creates a new component in the component database 214 reflecting the first-updated page three. Before synchronizing the updated row page by the first application, the component manager 212 detects a different change in page three by the second application (e.g., a "second-updated row three"). Likewise, the component manager 212 creates another new component in the component database 214 reflecting the second-updated row page.

The component manager 212, in one or more embodiments, resolves the conflict by adding the newly created components into the packaged file for the digital asset. To demonstrate, from the above example, the component manager 212 replaces the original page three with both the first-updated page three and the second-updated page three. For instance, the component manager 212 replaces the original page three with the first-updated page three, then adds the second-updated page three as a new page just below the first-updated page three (e.g., as row four while moving down the other rows). Alternatively, the component manager 212 keeps the original page three and adds the first-updated page three as page four and the second-updated page three as page five. After adding the newly created components into the packaged file for the digital asset, the component manager 212 can synchronize the updated digital asset between the applications and with the cloud synchronization system 232 as described above.

By adding each version of a conflicting component to a digital asset, the component manager 212 provides a user with the ability to easily detect that multiple versions of the same component are included in the digital asset. In contrast, conventional file management systems often duplicate the entire digital asset as being different versions and leave it to a user to discover where the changes in each versioned occurred, and which changes are the most current.

In some embodiments, the component manager 212 provides a notification or otherwise indicates when one or more conflicting components have been added to a digital asset (e.g., the component manager 212 highlights, bolds, italicizes, or changes the font color of a conflicting component). In addition, the component manager 212 can display metadata indicating the source and timestamp of each conflicting components (e.g., the component manager 212 displays a popup graphic upon the user hovering an input selector over each conflicting component). In this manner, a user can quickly identify and easily correct any error by removing, editing, or merging one or more of the conflicting components.

As described above, the component manager 212 manages changes to synchronization system that are stored as components within the component database 214. Additionally, the component manager 212 performs many of the same functions for components stored as packaged files within the digital asset synchronization system 210. Further detail regarding the component manager 212 with respect to these functions is provided after additional context is described regarding digital asset stored as packaged files.

A digital asset stored as a packaged file, as previously specified, is a singular monolithic file representation of a digital asset. In particular, a packaged file includes a collection of components that make up the digital asset. A packaged file is similar to a digital asset having components stored in the component database 214, except the components are co-located in the packaged file rather than distributed as independent files across the component database 214 and/or the first client device 202.

As also previously mentioned, digital assets stored as packaged files are located in a file directory. As such, a user can see and interact with a packaged file just as he or she would with a conventional file. In many embodiments, the packaged files 224 are stored in a file directory monitored by the digital asset management system 208 and/or the digital asset synchronization system 210 (e.g., a monitored parent/root folder having files and child/sub-folders located therein). In this manner, the digital asset synchronization system 210 can track and synchronize changes that occur within the file directory. According, as shown in FIG. 2, the digital asset synchronization system 210 includes a monitoring agent 220.

The monitoring agent 220 tracks and synchronizes files located in a monitored file directory that are associated with the digital asset synchronization system 210. In particular, the monitoring agent 220 communicates with an operating system of the first client device 202 as well as the cloud synchronization system 232 to detect when external changes occur to files (e.g., packaged and conventional files) within a monitored file directory. For example, the operating system on the first client device 202 informs the monitoring agent 220 that a packaged file has been added to the monitored file directory. As another example, the monitoring agent 220 detects when components in a packaged file are modified on the cloud synchronization system 232. In some embodiments, the monitoring agent 220 also monitors files located outside of the monitored directory, such as a file that has been moved to the desktop of a user's client device or placed in a temporary folder outside of the monitored directory.

As mentioned above, the monitoring agent 220 monitors the packaged files 224 within a monitored file directory to detect when one or more components that make up a digital asset change. When the monitoring agent 220 detects a change to a component in a packaged file, the monitoring agent 220 communicates with the component manager 212 and the packaging manager 222 to implement the modification within the digital asset synchronization system 210. In this manner, the monitoring agent 220, the component manager 212, and the packaging manager 222 collectively work to monitor and implement changes to the packaged files 224.

To demonstrate by way of example, upon detecting changes to a packaged file of a digital asset, the monitoring agent 220 alerts the component manager 212 of the digital asset and/or component that changed. For example, upon the monitoring agent 220 detecting that a packaged file has been modified on the cloud synchronization system 232, the monitoring agent 220 passes the identifier of the digital asset and/or the modified component to the component manager 212, which retrieves and updates the manifest for the digital asset. The component manager 212 then passes the modified component to the packaging manager 222 to update the packaged file. The packaging manager 222 is further described below.

When a modification occurs to a packaged file already located in the monitored file directory, the monitoring agent 220 can detect the change and notify the component manager 212 of the modification. The component manager 212 can then begin updating the packaged file. For example, a user opens a packaged file of a digital asset in an application. As such, the application accesses the components of the digital asset stored in the packaged file and displays the digital asset as a monolithic file (in a similar manner as if the application accessed and displayed components of a digital asset stored directly in the component database 214). Further, the application can request, from the monitoring agent 220, the identifier for the specific packaged file that the application is accessing. The application and/or monitoring agent 220 can then use the identifier to notify the component manager 212.

When the user desires to change (e.g., edit or add) a component within the application, the application provides the change to the monitoring agent 220 and/or component manager 212, and the component manager 212 creates a copy of the component in the component database 214 (e.g., copy-on-write). In addition, the component manager 212 applies the modifications to the component copy rather than to the component itself. The component manager 212 then provides the modified component to the packaging manager 222 to include in the packaged file for the digital asset.

If a user deletes a component in a packaged file, the monitoring agent 220 detects the deletion, and the component manager 212 instructs the packaging manager 222 to update the packaged file for the digital asset to remove/deactivate the deleted component. When an application creates a new set of components to be included in a packaged file, the monitoring agent 220 detects the deletion, and the component manager 212 first creates independent files in the component database 214 and assigns identifiers for each of the components. Then, the component manager 212 sends copies of the components of the digital asset to the packaging manager 222 to generate a packaged file for the digital asset.

As mentioned above, the monitoring agent 220 facilitates the synchronization of components with the first client device 202 as well as with the cloud synchronization system 232. In general, the monitoring agent 220 maintains a global registry of all digital assets/components stored in the monitored file directory (e.g., the monitoring agent 220 registers each component within the digital asset synchronization system 210 and/or the digital asset management system 208). As such, the monitoring agent 220 controls when synchronization occurs for each component. The monitoring agent 220, in some embodiments, employs the component manager 212 to synchronize components between the first client device 202 and the cloud synchronization system 232.

Returning to the component manager 212, upon creating new or modified copies of components to be included in a packaged file, in one or more embodiments, the component manager 212 creates a copy of the new or modified components within the component database 214, as previously described. In other words, when a change to a component within a packaged file occurs (e.g., within an application), the component manager 212 creates a temporary copy of the new component within the component database 214. The component manager 212 then sends the component copy to the packaging manager 222 to generate a new packaged file for the digital asset, as described below.

Furthermore, after the packaging manager 222 successfully creates or updates a packaged file for a digital asset, the component manager 212 removes the new component from the component database 214. As mentioned above, the component manager 212 sends copies of one or more components to the packaging manager 222 for the packaging manager 222 to include in a packaged file for a digital asset. As such, when the packaging manager 222 creates a packaged file for a digital asset, one copy of the components for the digital asset are stored in the component database 214 and a second copy of the components are stored in the packaged file for the digital asset. As such, the component manager 212 deletes the components stored in the component database 214 to avoid having duplicate copies of the same components stored on the first client device 202.

As part of sending copies of components of a digital asset and removing duplicate component copies from the component database 214, the component manager 212 also updates the mapping for the digital asset to reference the components in the packaged file. Stated differently, in preparation for removing the components of a digital asset from the component database 214, the component manager 212 changes the mapping (e.g., path) associated with each component to point to the packaged file created by the packaging manager 222. Going forward, when applications access the digital asset, the component manager 212 provides the applications access to the components stored in the packaged file for the digital asset rather than from the component database 214.

Turing now to the packaging manager 222, as mentioned above, the packaging manager 222 generates packages for a digital asset that include all of the components that make up the digital asset. The packaged file of the digital asset enables the digital asset to be represented as a singular monolithic file. More specifically, the packaging manager 222 creates new packaged files, modifies existing packaged files, replaces packaged files, and removes obsolete packaged files.

When creating a new packaged file, in one or more embodiments, the packaging manager 222 receives a copy of components from the component manager 212 to include in a packaged file. The packaging manager 222 packages the received components into a packaged file located in the monitored file directory of the digital asset synchronization system 210. In addition, the packaging manager 222 can report to the component manager 212 when a digital asset is successfully packaged into a packaged file.

In some embodiments, the packaging manager 222 packages the components by compressing the components into a packaged file. For example, the packaging manager 222 applies one or more compression algorithms to generate a packaged file for a digital asset that is reduced in size and easy to export. In an additional or alternative example, the packaging manager 222 employs one or more archival algorithms to include components of a digital asset in a packaged file for the digital asset. In one or more embodiments, the packaging manager 222 packages the components of a digital asset received from the component manager 212 in a CCP file or a PDF file.

When the packaging manager 222 receives a new component to include in an existing packaged file, the packaging manager 222 can add the component to the packaged file. For example, the packaging manager 222 appends the new component to the other components in the packaged file. In some embodiments, the packaging manager 222 can also append new or additional metadata (e.g., the manifest or other metadata) to the packaged file to indicate how the new component fits in with the existing components of the digital asset.

As an alternative to appending the new component within the packaged file, the packaging manager 222 generates a new packaged file to replace the packaged file. For example, if the packaging manager 222 receives a new component to replace an existing component, the packaging manager 222 can generate a new packaged file that includes the new component and excludes the original component. The packaging manager 222 may employ this option to regenerate the packaged file because some packaging methods, such as compression, do not allow the packaging manager 222 to directly replace an outdated component with an updated version of the component without recompressing the packaged file. Upon generating the new packaged file, the packaging manager 222 can delete or remove the previously packaged file for the digital asset from the first client device 202.

In embodiments where a direct replacement is available, the packaging manager 222 update the packaged file by directly swapping out an old component for the updated version of the component. In particular, the packaging manager 222 adds the new component to the packaged file, indicates to the component manager 212 that the new component has been added such that the component manager 212 can inform any application accessing the digital asset to update to the new component thereby unlocking access to the old component. Then, the packaging manager 222 can delete the old component and finish updating the packaged file for the digital asset (the now updated digital asset).

The packaging manager 222, in some instances, receives a request from the component manager 212 to remove or delete a component from a packaged file for a digital asset. Before deleting the component, as described above, the packaging manager 222 confirms that the component is not currently being accessed by an application. In one or more embodiments, when available as an option, the packaging manager 222 directly deletes the component. In other embodiments, such as in the case of a compressed packaged file, the packaging manager 222 appends metadata to the packaged file that indicates that the component is now obsolete (e.g., the obsolete component is not removed from the packaged file until the packaged file is regenerated). In additional embodiments, the packaging manager 222 repackages the packaged file (e.g., generates a new packaged file) to exclude the removed component, upon which, the packaging manager 222 deletes the old packaged file for the digital as set.

As mentioned above, in one or more embodiments, the packaging manager 222 replaces or deletes an old component in a packaged file by appending a new component or metadata to a packaged file. In these embodiments, the packaging manager 222 keeps the older versions of components and/or metadata. On the one hand, appending a new component or new metadata to a currently packaged file often requires less time and computational resources than generating a new packaged file and deleting the old packaged file. On the other hand, appending new components (and metadata) to a packaged file without removing obsolete components requires additional memory storage. For example, after the packaging manager 222 appends several components to the packaged file, the number of obsolete components in the packaged file outnumbers the components that make up the current version of the digital asset.

As such, the packaging manager 222 can employ one or more heuristics to determine whether to append a new component to a packaged file or generate a new packaged file for a digital asset. For example, the packaging manager 222 determines, either before or after appending the new component, whether to generate a new packaged file based on whether the currently packaged file exceeds a redundancy threshold. If so, the packaging manager 222 generates a new packaged file that includes the new component and excludes any outdated components and metadata.

The redundancy threshold, in one or more embodiments, is based on a data size. For example, if the data size of obsolete data from old components and/or metadata exceeds a threshold size (e.g., 500 kilobytes, 1 megabyte, or 10 megabytes), the packaging manager 222 determines to generate a new packaged file. Otherwise, if the redundancy threshold is not satisfied, the packaging manager 222 appends the new component to the existing packaged file. As another example, if the data size of obsolete data exceeds a data-size ratio or percentage (e.g., 10%, 30%, or 50% of the packaged file is obsolete data), then the packaging manager 222 determines to generate a new packaged file and delete the old packaged file.

Additionally, and/or alternatively, the redundancy threshold is based on the number of old and/or useful components within a packaged file. For example, if the number of old components reaches a threshold number (e.g., 3, 5, 10), then the packaging manager 222 determines to generate a new packaged file. In another example, if the ratio of obsolete-to-current components reaches a threshold ratio or percentage (e.g., 25% or 50% of the components in the packaged file are obsolete), then the packaging manager 222 determines to generate a new packaged file. The packaging manager 222 can employ one or more of the above heuristics when determining whether a packaged file exceeds (e.g., satisfies) one or more redundancy thresholds.

In some embodiments, the packaging manager 222 determines to first append a new component to a packaged file for a digital asset, then later generate a new packaged file for the digital asset. For example, while a digital asset is being accessed, the packaging manager 222 uses a first (e.g., stricter) redundancy threshold to determine whether to generate a new component to a packaged file. Then, when not being accessed, the packaging manager 222 uses a second lower (e.g., relaxed) redundancy threshold to determine whether to generate a new component to a packaged file to remove obsolete data or leave the packaged file as is.

As another example, the packaging manager 222 waits to generate a new packaged file for a digital asset when additional computational resources are available, such as when the first client device 202 is idle. In an additional example, the packaging manager 222 uses a schedule to routinely identify packaged files for digital asset that exceed the redundancy threshold and generates new packaged file for those digital assets. In another example, the packaging manager 222 remove obsolete data by generating new packaged files for digital assets upon receiving input from a user.

As a note, the packaging manager 222 generates packaged files from components first created in the component database 214. Likewise, in some embodiments, the packaging manager 222 can communicate with the component manager 212 to convert a packaged file for a digital asset back into components stored in the component database 214 and vice-versa. For example, a user receives an email that includes a packaged file for a digital asset. Upon opening the digital asset, the digital asset management system 208 and the digital asset synchronization system 210 may prompt the user to save the digital asset within the component database 214 or as a packaged file within the monitored file directory. Depending on the user's selection, the component manager 212 stores the components of the digital asset in the component database 214 or move the packaged file to the desired file directory. Later, the user may provide input to convert the packaged file to the component database 214 and vice-versa. To convert between a packaged file and a component database 214, the packaging manager 222 creates (or deletes) the packaged file for the digital asset in connection with deleting (or storing) components of the digital asset in the component database 214.

Depending on the digital asset type, storing the digital asset in the component database 214 may provide additional advantages to accessing the digital asset (e.g., faster access speed and real-time updates to edits). As such, in some embodiments, the digital asset management system 208 and the digital asset synchronization system 210 convert the digital asset to the component database 214 while the user is editing the digital asset, then upon the user saving and/or closing the digital asset, the component manager 212 sends the components to the packaging manager 222 to generate a new packaged file for the digital asset.

As shown in FIG. 2, the first client device 202 includes the one or more applications 226. The one or more applications 226 can communicate with the digital asset management system 208 and the digital asset synchronization system 210 to access one or more digital assets from the component database 214 or the packaged files 224. As mentioned above, the one or more applications 226 enable a user to create, view, copy, modify, and/or delete a digital asset. In some cases, the one or more applications 226 relate to a specific type of digital asset. For example, an application is a word-processing application that interfaces with digital documents. As another example, an application is an image editing/creating application that interfaces with digital images.

As mentioned, the one or more applications 226 access digital assets. In a first example, the component sub-manager receives a request from a user to open a digital asset. The component sub-manager communicates with the digital asset management system 208 and the digital asset synchronization system 210 to open, access, and display the digital asset as well as enable a user to modify components of the digital asset, which modifications the component sub-manager passes to the digital asset synchronization system 210. For instance, in accessing components of the digital asset, the component sub-manager interfaces with the digital asset synchronization system 210 to obtain a manifest for a digital asset. Using the manifest, the component sub-manager identifies the components that make up the digital asset, the order in which the components are displayed, and/or access the mapping (e.g., path) of where each component is stored (e.g., within the component database 214 or one of the packaged files 224). With access to the components, the application presents (e.g., displays) the digital asset to a user as a single monolithic file while allowing the user to individually interact with each component of the digital asset.

As further mentioned, an application, in one or more embodiments, enables a user to modify (e.g., create, change, or delete) one or more components of a digital asset. For instance, if the digital asset is an image having multiple layers, the application enables a user to edit content within a layer. In addition, the application can enable the user to add or remove layers. As described above, upon the application creating or modifying a digital asset based on user input, the component manager 212 of the digital asset synchronization system 210 detects changes to the components of the digital asset, updates the manifest for the digital asset, and creates one or more new components in the component database 214. Then, if the digital asset is represented by a packaged file, the component manager 212 sends the new components to the packaging manager 222 to include in the packaged file for the digital asset, synchronizes the new components with the cloud synchronization system 232, updates the mapping, and removes the new components from the component database 214, as described above.

As shown, in one or more embodiments, each client device can include multiple applications. As such, the first client device 202 enables a user to access the same digital asset simultaneously using two or more applications. As previously mentioned, when the user modifies the component within one application, the digital asset management system 208 and the digital asset synchronization system 210 causes the other applications to update and display the modified component.

In a similar manner, upon the digital asset synchronization system 210 receiving an update to a digital asset from the cloud synchronization system 232, the digital asset synchronization system 210 can enable the one or more applications 226 to automatically display the updated digital asset. For example, a user is viewing a digital video using an application on the first client device 202, and another user updates the digital video at the second client device 204. Upon the digital asset synchronization system 210 on the first client device 202 receiving the updated components (e.g., video segments, graphics, or titles), the digital asset synchronization system 210 on the first client device 202 notifies the application of the updated components such that the application provides the updated digital video to the user of the first client device 202. In some cases, the application updates the digital video as the user of the first client device 202 is watching the video, without requiring additional action by the user.

The elements 210-224 of the digital asset management system 208 can include software, hardware, or both. For example, the elements 210-224 can include one or more instructions stored on a computer-readable storage medium and executable by processors of one or more computing devices, such as a client device or server device. When executed by the one or more processors, the computer-executable instructions of the digital asset management system 208 can cause the computing device(s) to perform the feature learning methods described herein. Alternatively, the elements 210-224 can include hardware, such as a special-purpose processing device to perform a certain function or group of functions. Alternatively, the elements 210-224 of the digital asset management system 208 can include a combination of computer-executable instructions and hardware.

Furthermore, the elements 210-224 of the digital asset management system 208 may, for example, be implemented as one or more operating systems, as one or more stand-alone applications, as one or more modules of an application, as one or more plug-ins, as one or more library functions or functions that may be called by other applications, and/or as a cloud-computing model. Thus, the elements 210-224 may be implemented as a stand-alone application, such as a desktop or mobile application. Furthermore, the elements 210-224 may be implemented as one or more web-based applications hosted on a remote server. The elements 210-224 may also be implemented in a suite of mobile device applications or "apps." To illustrate, the elements 210-224 may be implemented in an application, including but not limited to ADOBE CREATIVE CLOUD software. "ADOBE," and "CREATIVE CLOUD" are either registered trademarks or trademarks of Adobe Systems Incorporated in the United States and/or other countries.

FIG. 2 also illustrates a cloud synchronization system 232, which includes a remote component database 234. As shown, the cloud synchronization system 232 is located on a server device 230. One will appreciate, however, that the cloud synchronization system 232 can be distributed across multiple server devices. For example, the remote component database 234 is located on one or more server devices separate from the cloud synchronization system 232.

The cloud synchronization system 232, in general, stores remote copies of components of digital assets, including components that correspond to previous versions of digital assets. In this manner, when fully synchronized, digital assets stored on a client device will also be stored in the remote component database 234. In some embodiments, the cloud synchronization system 232 allocates a cloud identifier to each component stored in the remote component database 234. In addition, the cloud synchronization system 232 serves as a common hub to synchronize digital asset between client devices (e.g., between the first client device 202 and the second client device 204). In some embodiments, the cloud synchronization system 232 also provides online services, such as online applications that enable a user to view and edit digital assets.

In addition, the remote component database 234 often includes more digital assets than found on a client device. For example, client devices often do not locally synchronize a user's entire digital asset collection. In addition, the server device 230 typically has a larger storage capacity than a client device, especially mobile client devices, and as such can store more digital assets and versions of digital assets than the client device. In this manner, the cloud synchronization system 232 can provide some or all previous versions of a digital asset to a client device upon request.

One distinction between the cloud synchronization system 232 and a synchronization system 210 on a client device is that the cloud synchronization system 232 does not need to store digital assets as packaged files. In general, a user does not directly interface with digital assets on the cloud synchronization system 232. As such, the cloud synchronization system 232 can store digital assets (including previous versions) within the remote component database 234. Further, the cloud synchronization system 232 can store digital assets belonging to different users in the same remote component database 234 so long as the cloud synchronization system 232 maintains appropriate permissions and user authorizations for each digital asset.

In some embodiments, the cloud synchronization system 232 provides a user with remote access to digital assets, such as via a web browser. As mentioned above, the cloud synchronization system 232 provides online services, such as online applications that enable a user to view and edit digital assets. In additional embodiments, the cloud synchronization system 232 provides an online file directory of the user's digital asset that matches or includes all of the digital assets in the monitored file directory on the first client device 202 and/or the second client device 204. In these embodiments, the cloud synchronization system 232 need not create a packaged file for a digital asset as on the client device, but can symbolically represent the digital asset to the user, such that the digital asset appears as a single monolithic file within the online file directory.

Further, the cloud synchronization system 232 can present one or more previous versions of the digital asset to the user in connection with the digital asset. In a similar manner, the cloud synchronization system 232 can display a list of all digital assets included in the remote component database 234, also including previous versions.

Figure 3:
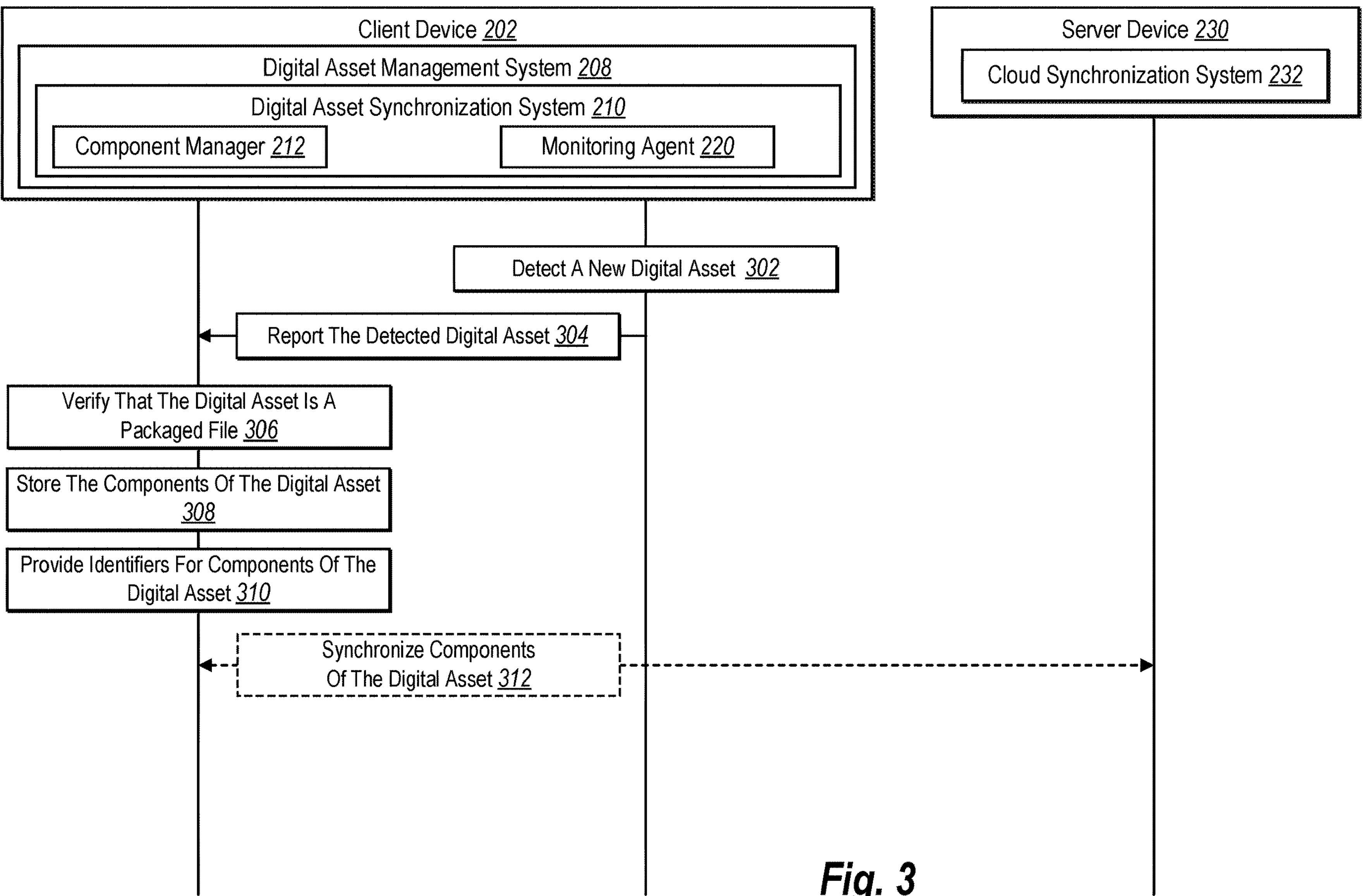
FIGS. 3-12 illustrate various sequence diagrams of the digital asset synchronization system managing and synchronizing components of a digital asset between a component database and packaged files in accordance with one or more embodiments.
Figure 4:
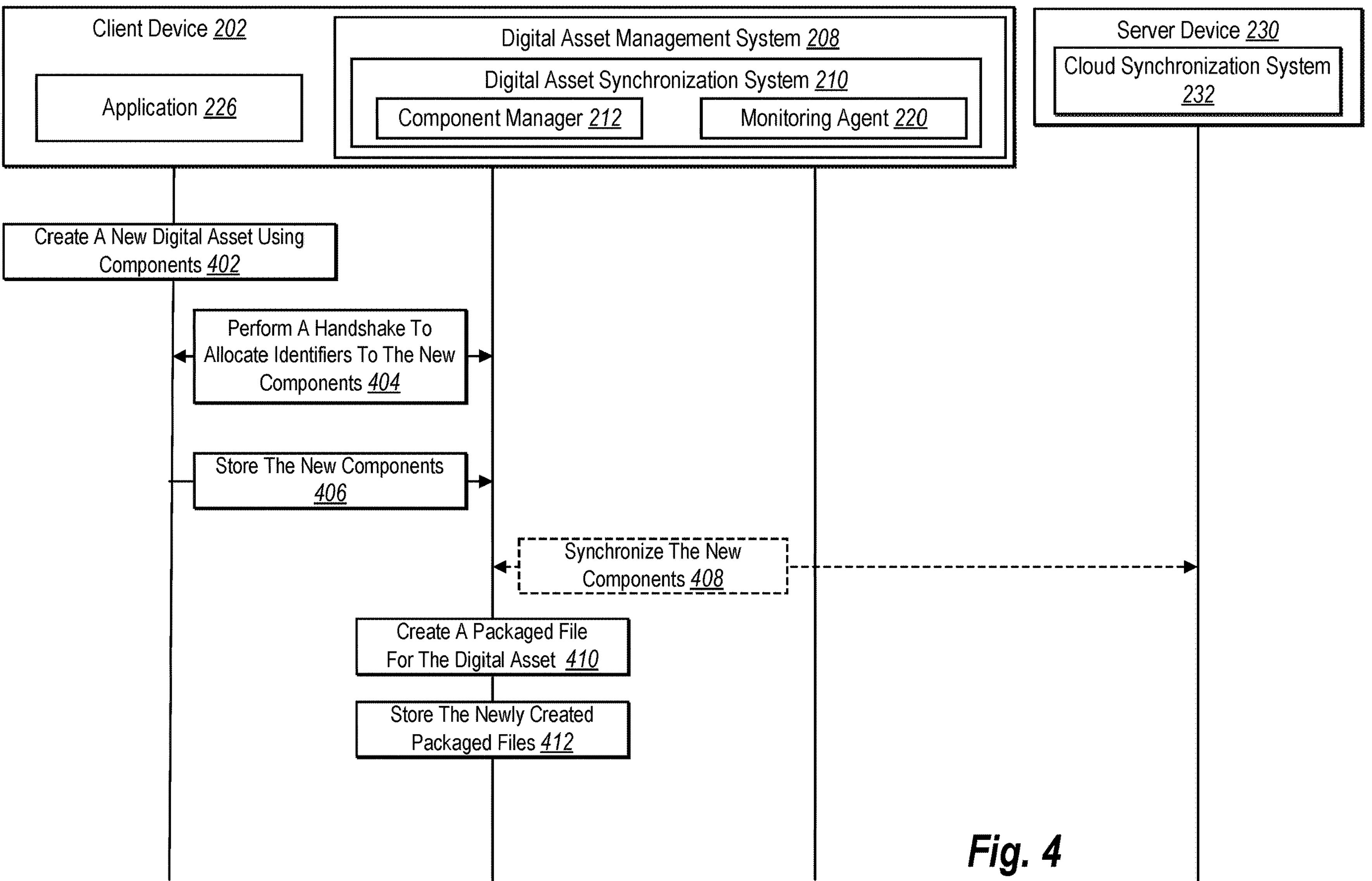
Figure 5:
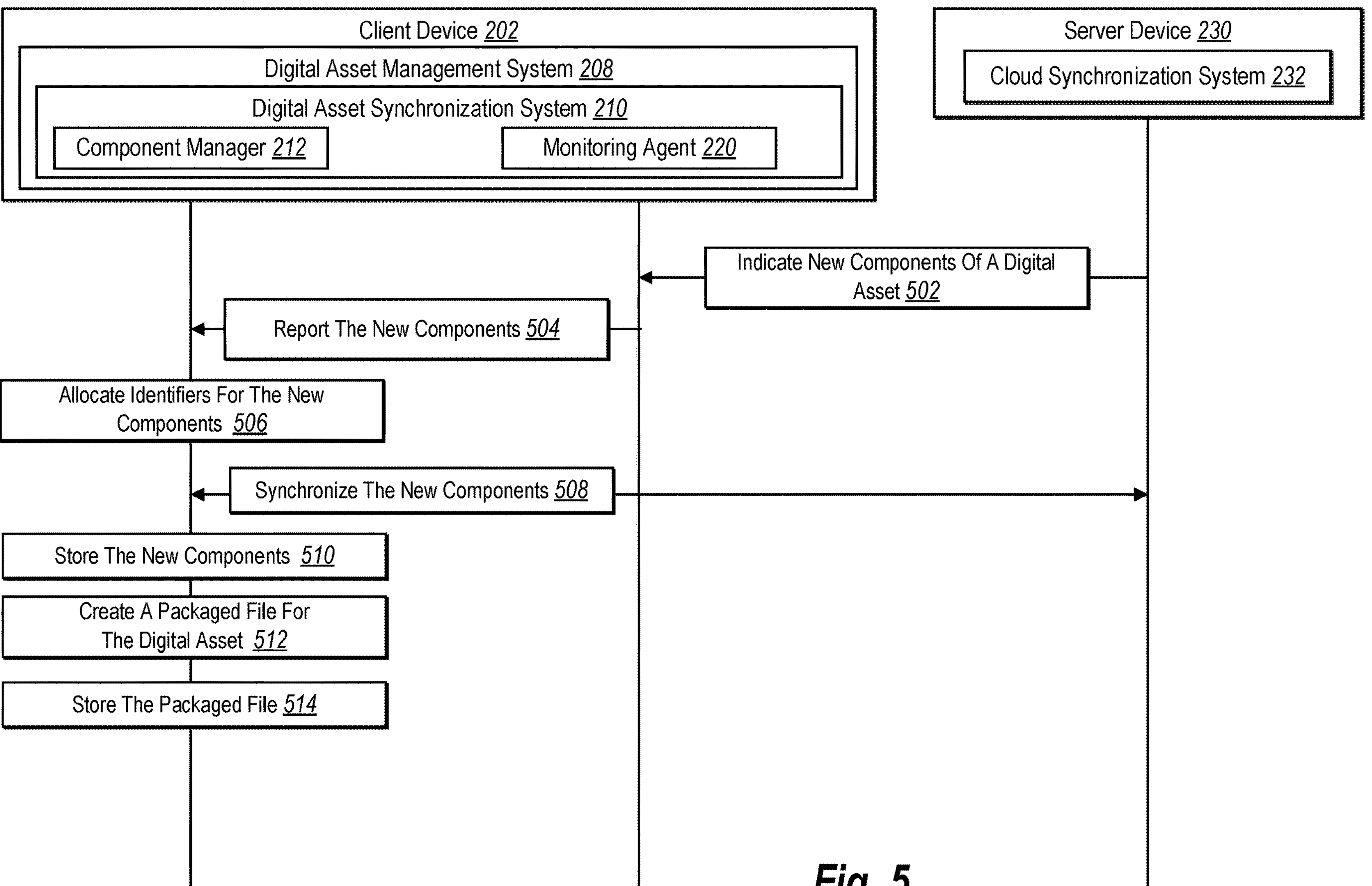
Figure 6:
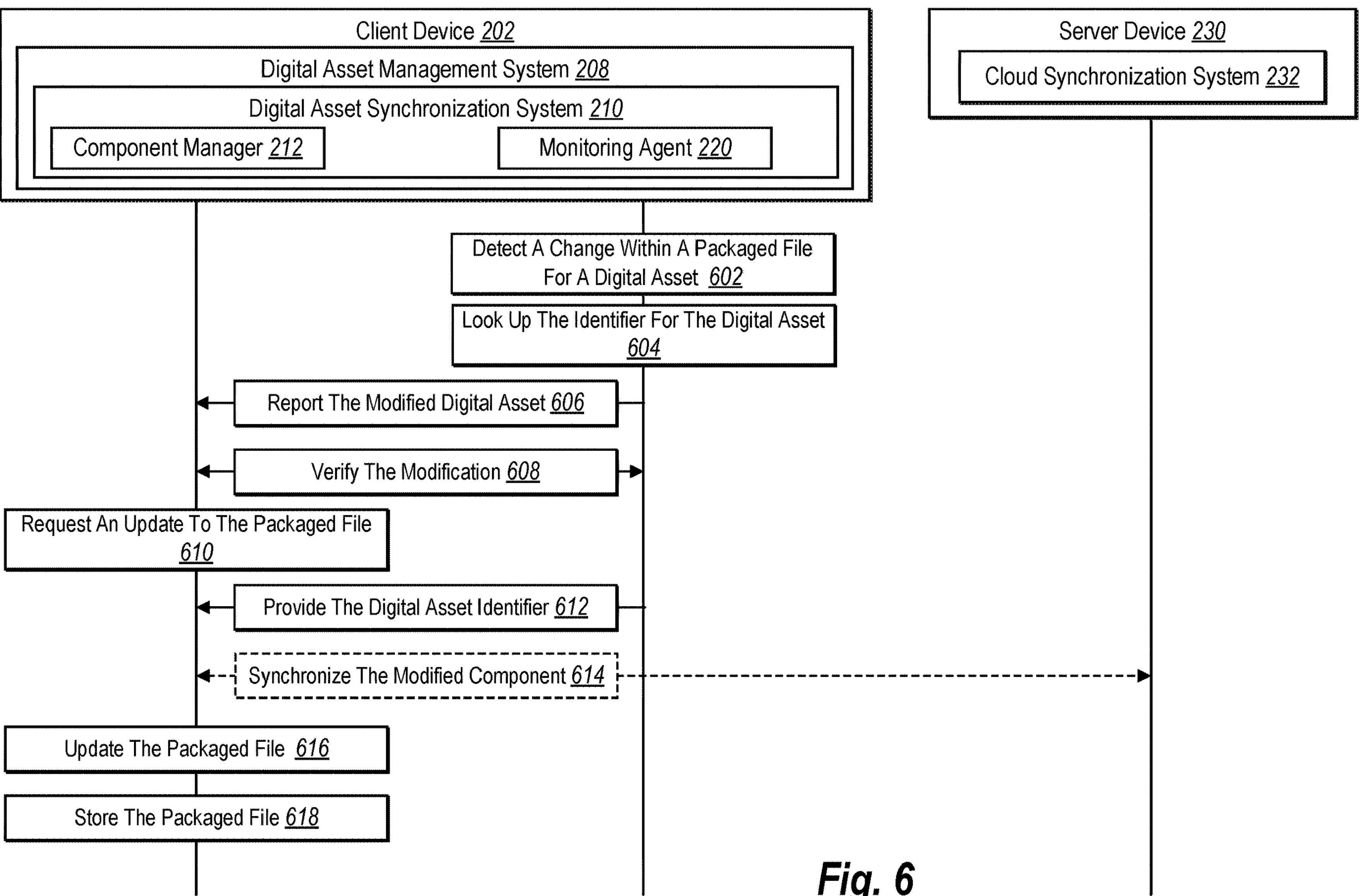
Figure 7:
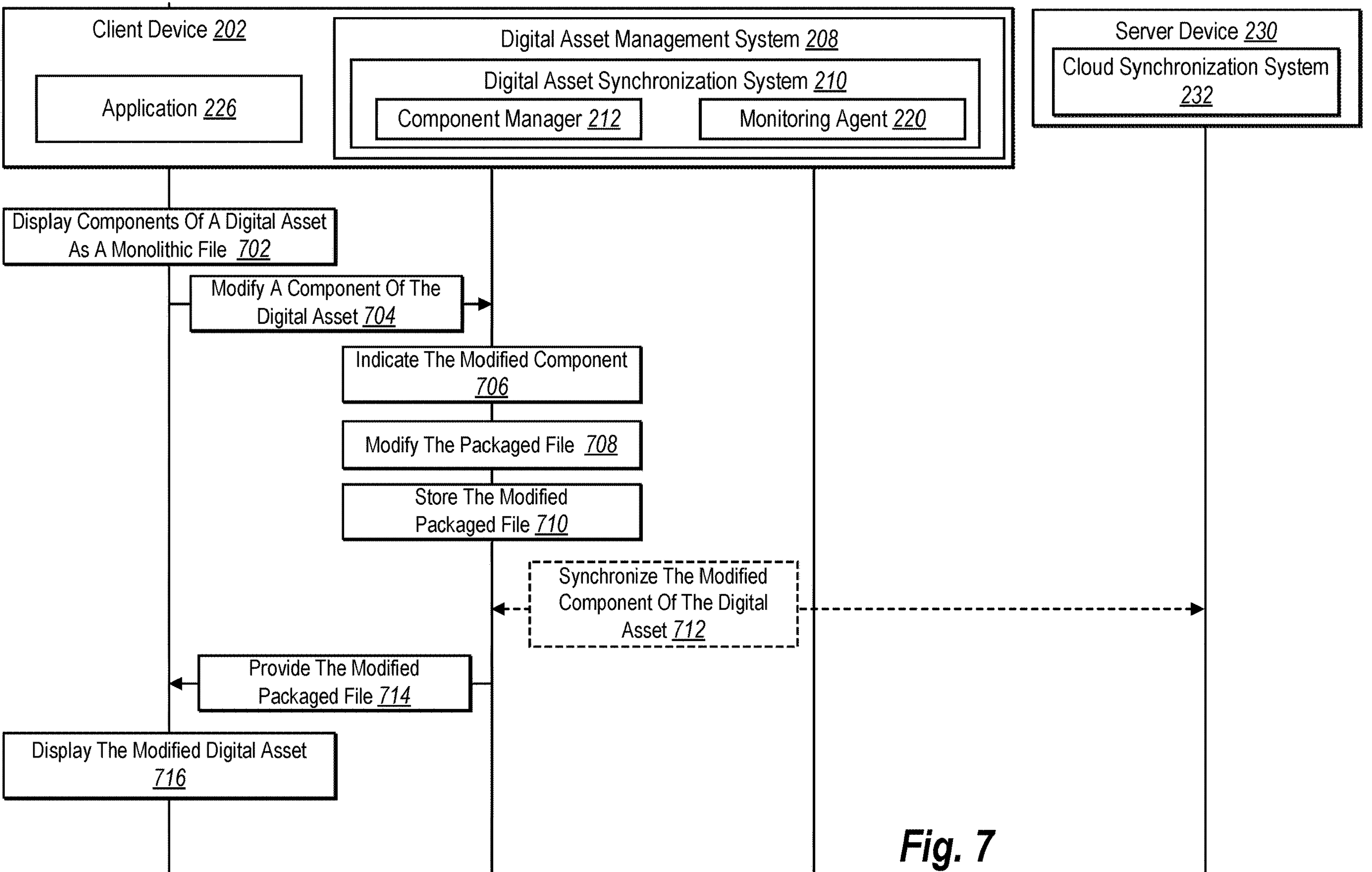
Figure 8:
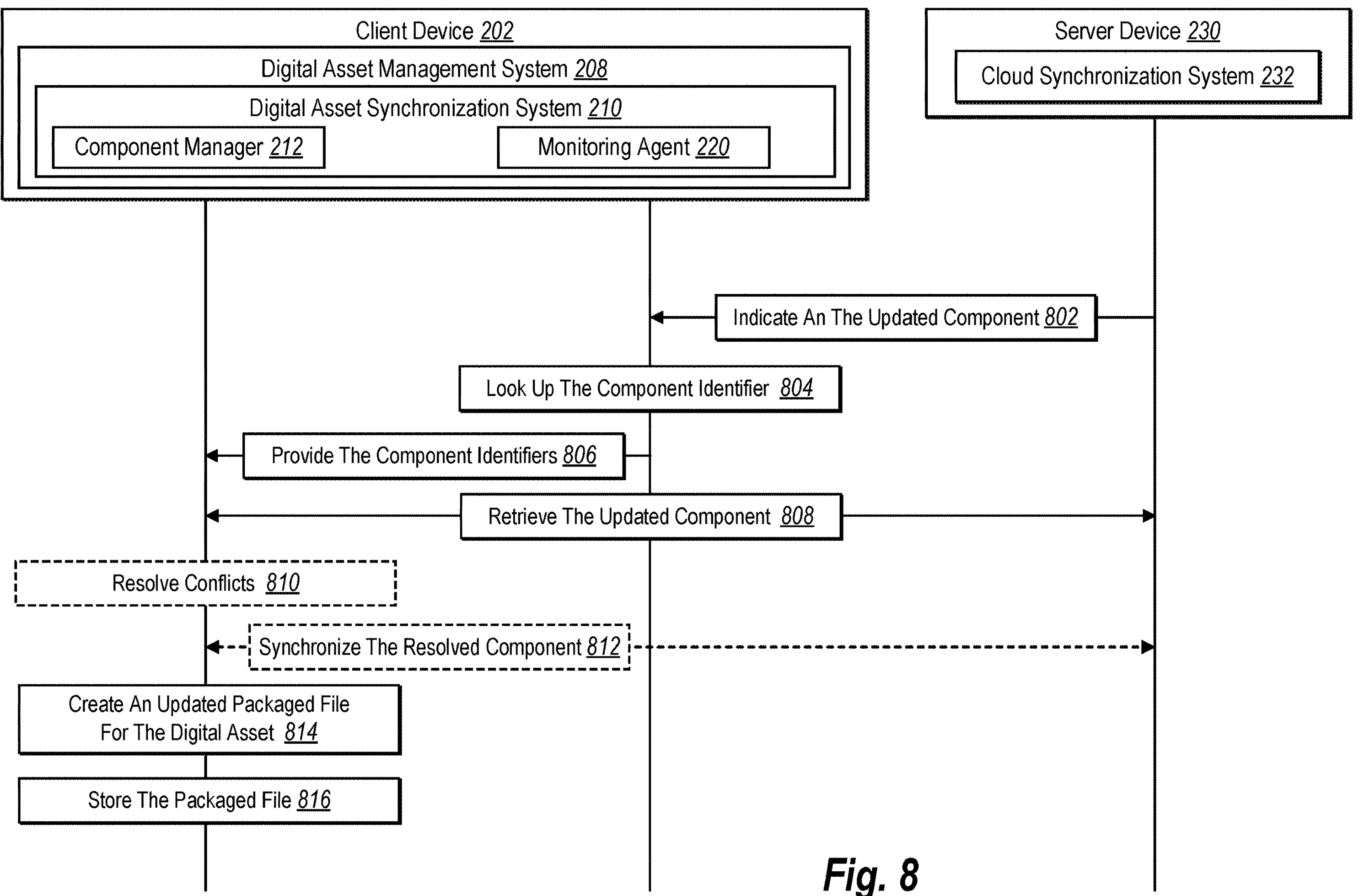
Figure 9:
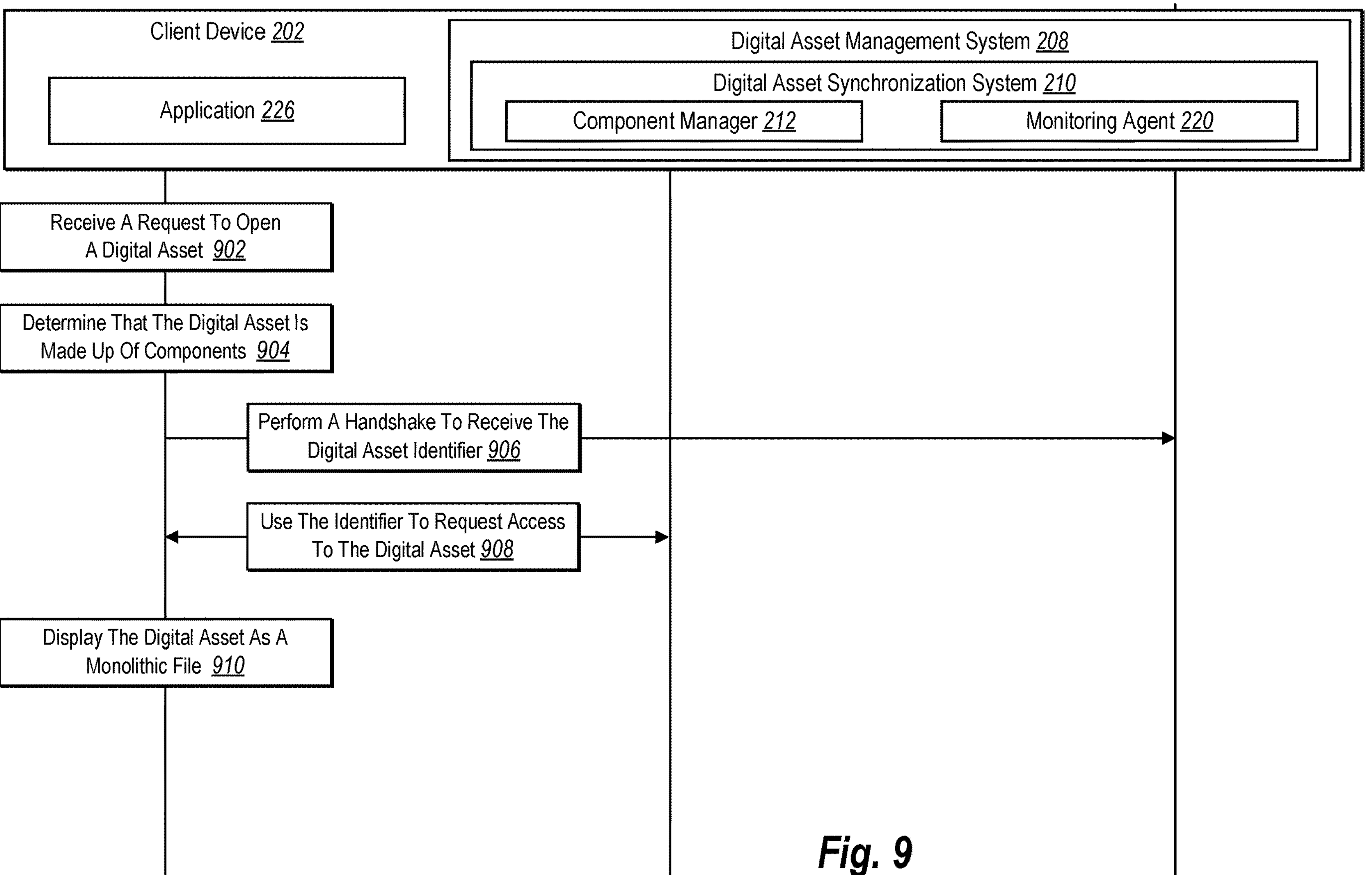
Figure 10:
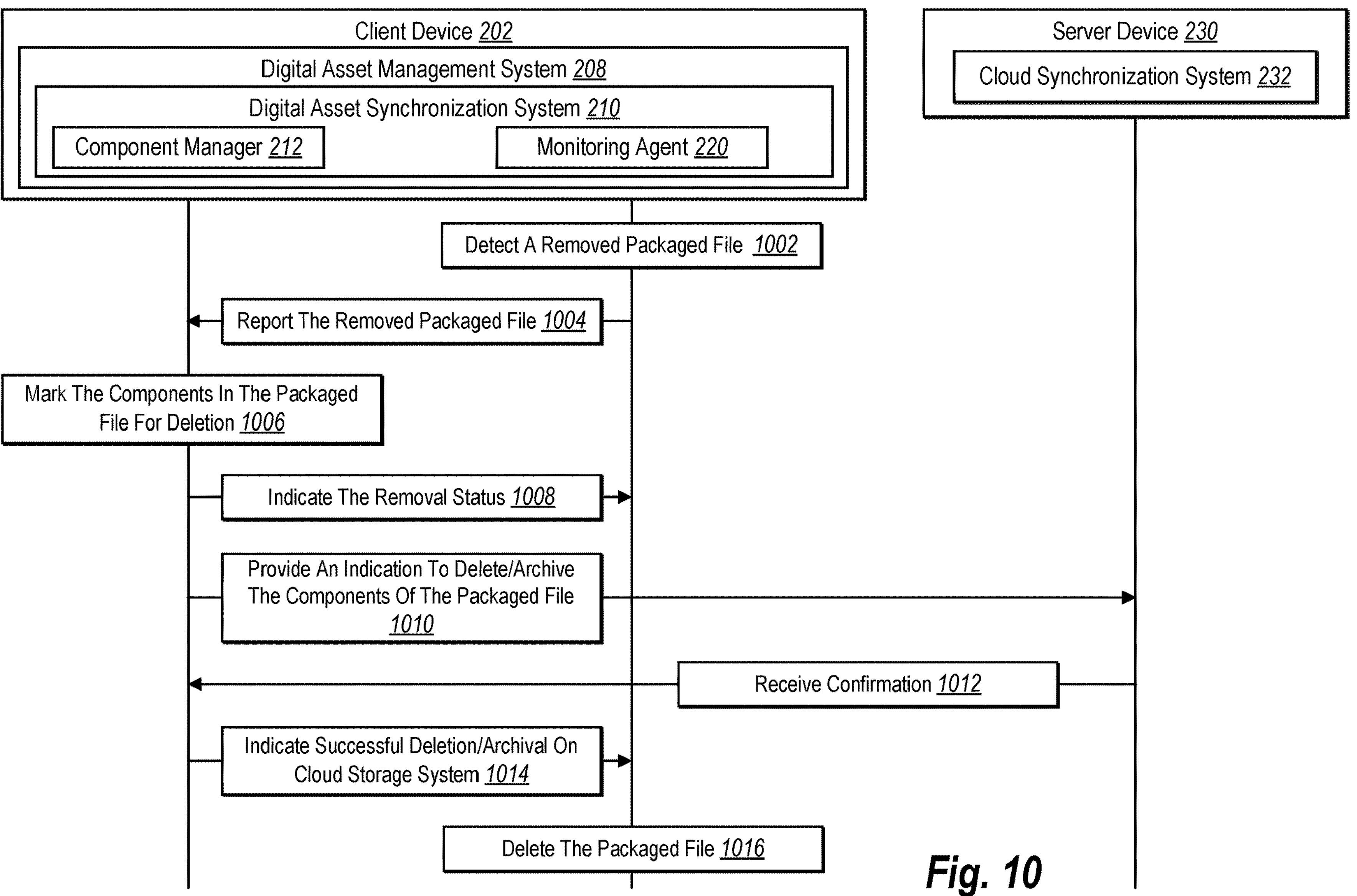
Figure 11:
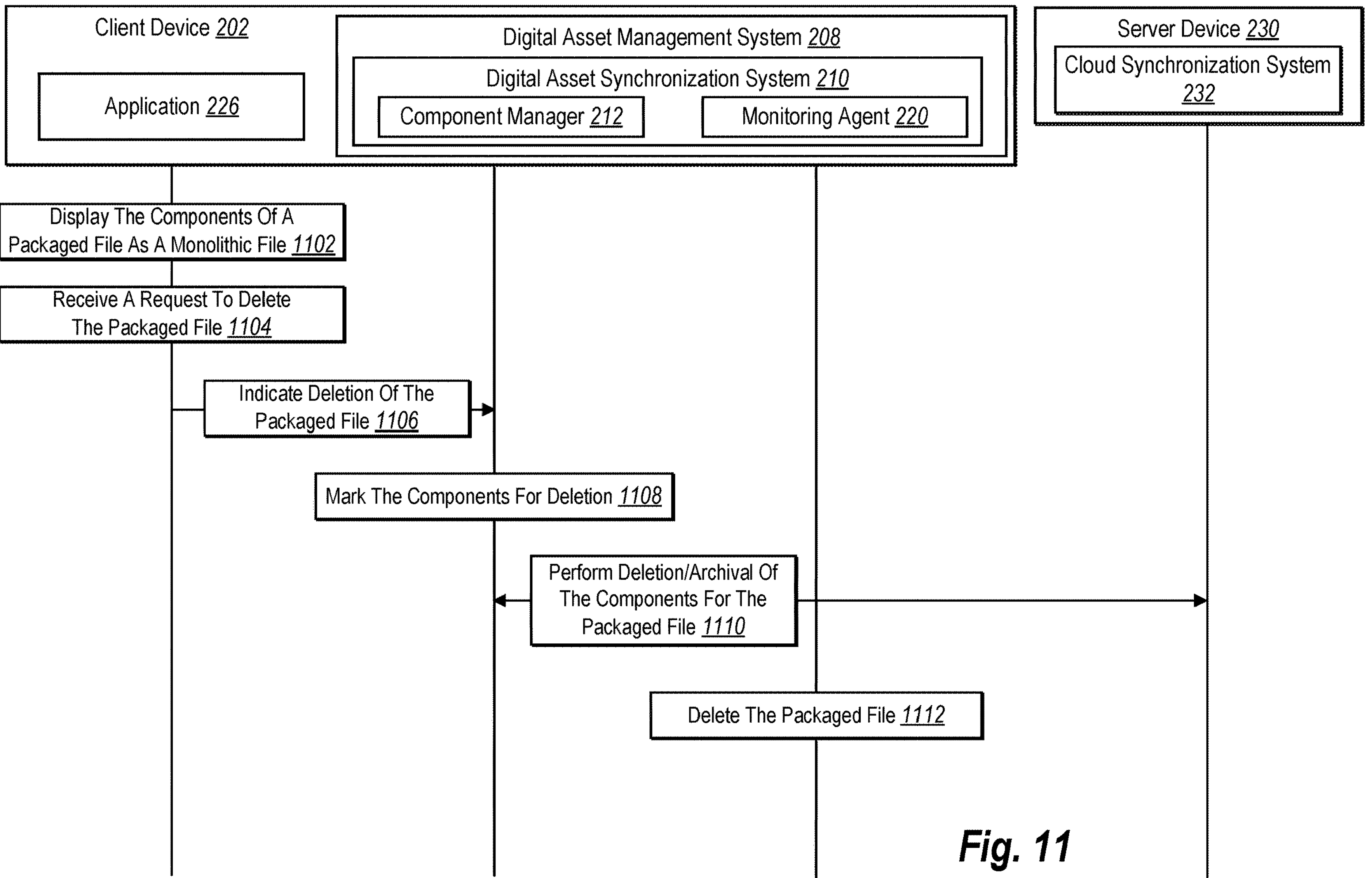
Figure 12:
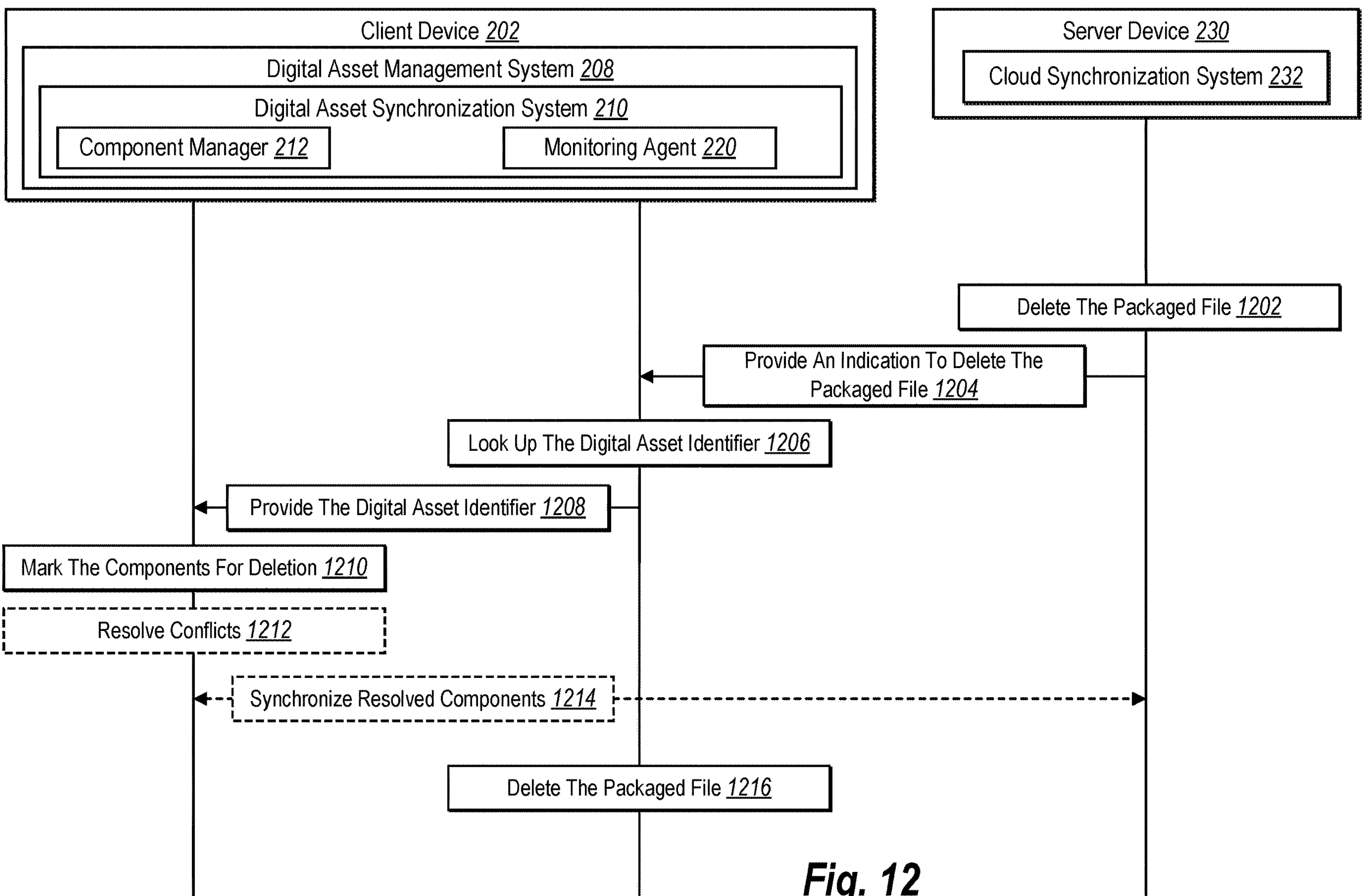

As described above, FIG. 2 illustrates a framework of a synchronization system 210 (with a digital asset management system 208) with respect to a packaged file for a digital asset. Proceeding forward, FIGS. 3-12 illustrate example implementations and operations of the digital asset management system 208 and the digital asset synchronization system 210 creating, updating, opening, and removing a packaged file for a digital asset. In one or more embodiments, FIGS. 3-12 relates to the digital asset synchronization system 208 providing an application programming interface (API) for the component manager 212 (e.g., using DCX) and the monitoring agent 220 (e.g., via CoreSync). In particular, FIGS. 3-5 illustrate the digital asset management system 208 and the digital asset synchronization system 210 creating new a packaged file for a digital asset, FIGS. 6-8 illustrates the digital asset management system 208 and the digital asset synchronization system 210 updating a packaged file for a digital asset, FIG. 9 illustrates the digital asset management system 208 and the digital asset synchronization system 210 opening a packaged file of a digital asset, and FIGS. 10-12 illustrate the digital asset management system 208 and the digital asset synchronization system 210 removing a packaged file of a digital asset. For the sake of brevity and where appropriate, the description accompanying FIGS. 3-12 refer back to FIG. 2, which more fully describes actions, steps, operations, and/or methods performed by the digital asset synchronization system and/or cloud storage system.

Each of FIGS. 3-12 includes a client device 202 having the digital asset management system 208 and the digital asset synchronization system 210 (or simply "synchronization system 210"). The client device 202 can be an embodiment of the first client device 202 described with respect to FIG. 2. Likewise, the digital asset management system 208 and the digital asset synchronization system 210 can each embody one or more embodiments of the digital asset management system 208 and the digital asset synchronization system 210 previously described. For example, the digital asset synchronization system 210 in FIGS. 3-12 each includes a component manager 212 and a monitoring agent 220, as described above.

Additionally, FIGS. 4,7, and 11 also include an application 226 with the client device 202, which embodies the one or more applications 226 described above. Furthermore, FIGS. 3-8 and 10-12 also include a server device 230 that hosts a cloud synchronization system 232. The server device 230 and the cloud synchronization system 232 can each embody one or more embodiments of the server device 230 and cloud synchronization system 232 previously described.

As mentioned, FIGS. 3-5 show the digital asset synchronization system 210 creating a new packaged file for a digital asset. In particular, FIG. 3 illustrates a sequence diagram of the digital asset synchronization system 210 creating a new packaged file for a digital asset upon detecting a new digital asset. For instance, the digital asset synchronization system 210 detects a new digital asset being placed in a monitored file directory.

As shown in FIG. 3, the monitoring agent 220 of the digital asset synchronization system 210 detects 302 a new digital asset. For example, a user moves the digital asset into the monitored file directory from a non-monitored file directory on the client device 202. In another example, a user saves a digital asset received in an email message to the monitored file directory, or the user otherwise saves a digital asset downloaded from the Internet to the monitored file directory. In an additional example, a user using an application that does not interface with components (e.g., the application is not configured to access or display components of a digital asset as a single file) saves a digital asset within the monitored file directory. In each of these examples, upon the digital asset being moved or saved to the monitored file directory, the monitoring agent 220 detects the new digital asset.

In general, the monitoring agent 220 detects when a new digital asset is added to the monitored filed directory. The monitoring agent 220, however, does not detect whether the digital asset is a packaged file that includes components or a conventional file. For example, the digital asset is a newly added digital asset as mentioned above. In another example, the digital asset is a newly created packaged file from components. As such, the monitoring agent 220 provides all detected new or updated files to the component manager 212, which determines whether the digital asset is a packaged file.

As mentioned, upon detecting a new digital asset, the monitoring agent 220 reports 304 the detected digital asset to the component manager 212. Reporting the digital asset, in some embodiments, includes providing the file mapping of the newly added digital asset to the component manager 212 such that the component manager 212 can access the digital asset.

The component manager 212 then verifies 306 that the digital asset is a packaged file. For example, the component manager 212 identifies that the digital asset includes a collection of components. In another example, the component manager 212 identifies metadata associated with the digital asset that indicates that the digital asset is a packaged file. Alternatively, the component manager 212 determines that the digital asset is a conventional file that does not contain stored components. In some embodiments, the component manager 212 determines that digital asset is a packaged file based on the file extension of the digital asset (e.g., .ccp, .zip, or .pdf).

Upon determining that the digital asset is a packaged file, the component manager 212 stores 308 the components of the digital asset in the component database. As part of storing the digital asset, the component manager 212 assigns a record id to the digital asset. Additionally, in one or more embodiments, the component manager 212 uses metadata from the packaged file to store identifiers for the components of the digital asset. For example, the component manager 212 transfers the identifiers from a manifest included in the packaged file to the component database. Alternatively, the component manager 212 generates new identifiers for each of the components of the digital asset included in the packaged file.

Using the identifiers associated with the components of the digital asset, in some embodiments, the component manager 212 generates a manifest and corresponding mapping for the digital asset. For example, the component manager 212 maps the location of each component back to the packaged file. By generating a new manifest and corresponding mapping, the component manager 212 can track and implement future changes to the digital asset, as described above. In alternative embodiments, the component manager 212 receives the manifest from the packaged file and updates the received manifest to reference the new mapping (e.g., path) of the components.

After storing the components of the digital asset within the component database, the component manager 212 provides 310 the identifier (e.g., record id) for the digital asset. While not shown, once the component manager 212 provides the identifier, the monitoring agent 220 can access and use the record id in future calls to the component manager 212. As described below, the monitoring agent 220 passes the record id to the component manager 212 upon detecting a change in the digital asset.

The component manager 212 can also optionally 312 synchronize 312 components of the digital asset with the cloud synchronization system 232. In particular, the component manager 212 sends the manifest and the components of the digital asset to the cloud synchronization system 232. As described above in connection with FIG. 2, the digital asset synchronization system 210 can synchronize components with the cloud synchronization system 232, which stores remote copies of digital assets, including multiple versions of a digital asset.

FIG. 4 illustrates a sequence diagram of the digital asset synchronization system 210 creating a new packaged file for a digital asset on the client device 202. For instance, a user creates a new digital asset within the application 226 on the client device 202 that the digital asset synchronization system 210 stores as a packaged file.

As shown, the application 226 creates 402 a new digital asset that uses components to make up the digital asset. For instance, in response to a user requesting a new digital image (i.e., digital asset), the application 226 provides the user with a blank canvas that is made up of a background layer (i.e., component), a foreground layer, and one or more hidden layers containing metadata for the digital image.

In connection with the application 226 creating a collection of components for a new digital asset, the application 226 performs 404 a handshake with the component manager 212 and to allocate identifiers to the new components. As described above, the component manager 212 allocates and registers identifiers for new components. As such, the handshake includes the component manager 212 creating a record id for the digital asset, and storing the new digital asset. In this manner, the handshake includes the component manager 212 allocating identifiers for the new components.

In one or more embodiments, the digital asset synchronization system 210 employs one or more inter-process communications (IPC), such as a VULCAN remote process call (RPC) request, to facilitate the handshake between the application 226 and the digital asset synchronization system 210. In some embodiments, the handshake must successfully complete before the digital asset synchronization system 210 performs additional actions with respect to the digital asset, such as storing the new components in the component database or synchronizing the new components.

Upon completing the handshake, the component manager 212 stores 406 the new components of the digital asset in the component database. For example, the component manager 212 receives the new components from the application 226, associates the new components with the allocated identifiers, maps, and registers the new components in the component database. As described above, the component manager 212 can also create a new manifest for the digital asset that includes the components and the mapping of the components.

The component manager 212 can also optionally synchronize 408 the new components of the digital asset with the cloud synchronization system 232. In particular, the component manager 212 sends the manifest and the new components of the digital asset to the cloud synchronization system 232. As described above in connection with FIG. 2, the digital asset synchronization system 210 synchronizes new components with the cloud synchronization system 232 soon after storing the new components to ensure the news components are safely backed up.

As shown in FIG. 4, the component manager 212 creates 410 a packaged file of the digital asset. More specifically, as described above with regard to FIG. 2, the component manager 212 sends copies of the component to a packaging manager, which generates the packaged file. For simplicity, however, the packaging manager in is not shown in FIGS. 4-12, but the functions of the packaging manager are incorporated in the shown component manager 212.

The component manager 212 then stores 412 the newly created packaged file for the digital asset. After the packaged file is created, as detailed above, the component manager 212 updates the mapping to reference the new components in the packaged file and removes the components from the component database. The monitoring agent 220 then monitors the newly stored digital asset in the monitored file directory and reports to the component manager 212 when a change to the digital asset occurs, as described above.

As a note, FIG. 4 is described in terms of a user creating a new digital asset that has components on the application 226. Additionally, the actions provided in FIG. 4 are also applicable to when a new digital asset overwrites a previous digital asset. In particular, when a new digital asset overwrites a previous digital asset, the digital asset synchronization system 210 recognizes the new digital asset as new and follows the actions provided above. Further, the digital asset synchronization system 210 deletes the overwritten digital asset, which is described below with respect to FIGS. 10-12.

FIG. 5 illustrates a sequence diagram of the digital asset synchronization system 210 creating a new packaged file for a digital asset based on receiving components of the digital asset from the cloud synchronization system 232. For instance, a synchronization system on another client device creates and uploads a digital asset to the cloud synchronization system 232, which is then synchronized with the client device 202.

As shown, the cloud synchronization system 232 indicates 502 new components of a digital asset to the digital asset synchronization system 210 via the monitoring agent 220. For example, the cloud synchronization system 232 provides a message to the monitoring agent 220 that indicates a new digital asset is being stored on the cloud synchronization system 232. Alternatively, the monitoring agent 220 periodically communicates with the cloud synchronization system 232 to report changes and discover when new or modified digital assets on the cloud synchronization system 232 are ready to be synchronized with the client device 202.

Upon detecting the new digital asset, the monitoring agent 220 reports 504 the new components to the component manager 212, as described above. As also described above, the component manager 212 allocates identifiers 506 for the new components as well as allocates an identifier (e.g., record id) for the digital asset, each of which the component manager 212 can provide to the monitoring agent 220.

The component manager 212 then synchronizes 508 with the cloud synchronization system 232 to receive the new components and. For example, the cloud synchronization system 232 pushes the new components of the digital asset to the component manager 212. In an alternative example, the cloud synchronization system 232 informs the component manager 212 of the new digital asset, and the component manager 212 pulls the components from the cloud synchronization system 232 and temporarily stores the components in the component database.

After receiving the new components, the component manager 212 stores 510 the new components of the digital asset in the component database using the allocated identifiers. The component manager 212 also creates a manifest for the digital asset, as previously described. In addition, the component manager 212 (in connection with a packaging manager) creates 512 a packaged file for the digital asset, as explained above. Further, as described earlier, the component manager 212 stores 514 the newly created packaged file for the digital asset.

FIG. 6 illustrates a sequence diagram of the digital asset synchronization system 210 updating a packaged file on the client device 202. In general, FIG. 6 describes replacing a packaged file with a new copy of the packaged file. For example, a user interacting with an application changes one or more components of a digital asset, which triggers the digital asset synchronization system 210 to generate a new packaged file for the digital asset.

More specifically, FIG. 6 shows the monitoring agent 220 detecting 602 a change in a packaged file for a digital asset. For example, the monitoring agent 220 detects that an application accessing the digital asset stored as a packaged file. In another example, the monitoring agent 220 detects that a user is updating (e.g., adding, editing, removing) one or more components within the packaged file for the digital asset. In some embodiments, as described above, the component manager 212 detects a change to one or more components within the packaged file for the digital asset.

As mentioned above, after creating a new packaged file for a digital asset, the component manager 212 provides one or more identifiers to the monitoring agent 220. Then, when the monitoring agent 220 reports a modified digital asset to the component manager 212, the monitoring agent 220 uses the identifier corresponding to the modified digital asset. To illustrate, FIG. 6 shows the monitoring agent 220 looking 604 up the identifier for the digital asset upon detecting a change in the packaged file for the digital asset. The monitoring agent 220 then uses the identifier to report 606 the modified digital asset to the component manager 212.

As shown, the component manager 212 verifies 608 the modification to the digital asset. In particular, the component manager 212 verifies that a change has been made to one or more components within the packaged file for the digital asset. In some instances, the monitoring agent 220 indicates a change to the packaged file based on the component manager 212 previously creating or writing the packaged file. In these instances, the component manager 212 disregards the notification from the monitoring agent 220 as the packaged file for the digital asset has not actually changed.

Upon verifying that one or more components of the packaged file for the digital asset have changed (e.g., another actor besides the component manager 212 implemented the change), the component manager 212 must synchronize the packaged file within the digital asset synchronization system 210. In particular, the illustrated embodiment shows that the component manager 212 requests 610 an update the packaged file for the digital asset. In alternative embodiments, the component manager 212 provides a request to the monitoring agent 220 to schedule the update. For example, as described above, the monitoring agent 220 has global knowledge regarding all pending synchronization operations (both within the digital asset synchronization system 210 and with the cloud synchronization system 232). As such, in these alternative embodiments, the component manager 212 defers the scheduling of packaged file updates asset to the monitoring agent 220.

The monitoring agent 220, when ready to have the packaged file for the digital asset updated, provides 612 the digital asset identifier to the component manager 212, which initiates the package updating process. In one or more embodiments, the monitoring agent 220 also provides the mapping (e.g., path) there the digital asset is located in the monitored file directory. The component manager 212 uses the identifier to identify the digital asset and which components have been updated within the packaged file.

As shown, in some embodiments, the component manager 212 synchronizes 614 the modified components with the cloud synchronization system 232 before updating the packaged file for the digital asset. In addition, the component manager 212 (in connection with a packaging manager) updates 616 the packaged file as previously explained. Further, as described earlier, the component manager 212 stores 618 the updated packaged file for the digital asset. For example, the component manager 212 and/or a packaging manager append or regenerate the packaged file for the digital asset, as detailed above in connection with FIG. 2

In some embodiments, when updating the components in the component manager 212, the monitoring agent 220 determines that additional changes to the digital asset are available on the cloud synchronization system 232. For example, when synchronizing with the cloud synchronization system 232, the component manager 212 determines that additional modifications for the digital asset occurred on another client device. As such, the digital asset synchronization system 210 receives the updated components and repeats the process of updating the packaged file, as described herein.

FIG. 7 illustrates a sequence diagram of the digital asset synchronization system 210 updating a packaged file upon the application 226 modifying a component within the packaged file. For example, a user edits the digital asset with the application 226, which causes the application to modify one or more components of the packaged file for the digital asset.

As shown, the application 226 displays 702 components of a digital asset as a monolithic file. For example, the application 226 locates and accesses the components of the digital asset within the packaged file to display the digital asset within the application 226, as described above. As such, the application 226 can display the components of the digital asset such that the digital asset appears as a singular file.

Next, as illustrated, the application 226 modifies 704 a component of the digital asset. For example, in response to user input, the application 226 adds, changes, or removes a component of the digital asset. In addition, the application 226 can indicate the change to the component manager 212, as shown. As described above, if a component is being changed or added, the component manager 212 creates a new copy of the component including the modifications and temporarily stores the new component copy in the component database.

The component manager 212, as shown in FIG. 7, then indicates 706 the modified component as well as modifies 708 the packaged file for the digital asset, as described above. In addition, the component manager 212 stores 710 the modified packaged file for the digital asset. In some embodiments, the monitoring agent 220 detects that a digital asset has changed within the monitored file directory, as previously described.

Once the component manager 212 (and/or the packaging manager) generates and stores the modified packaged file for the digital asset, the component manager 212 synchronizes 712 the modified components of the digital asset with the cloud synchronization system 232. As described above, in some embodiments, while synchronizing with the cloud synchronization system 232, the component manager 212 detects additional changes to the digital asset. Accordingly, the digital asset synchronization system 210 receives the updated components and repeats the process of updating the packaged file, as described herein, which can include further regenerating the packaged file for the digital asset.

Additionally, as shown, the component manager 212 provides 714 the modified packaged file for the digital asset to the application 226. The application 226 then displays 716 the modified digital asset to the user. In one or more embodiments, and as described above, the component manager 212 communicates with the application 226 to have the component access the newly created packaged file of the updated component appended to the existing packaged file, upon which, the component manager 212 deletes the old component from the component database.

FIG. 8 illustrates a sequence diagram of the digital asset synchronization system 210 updating a packaged file based on an updated digital asset received from the cloud synchronization system 232. For example, the digital asset synchronization system 210 detects that a digital asset on the cloud synchronization system 232 is a more recent version than the version stored on the client device 202.

As shown, the cloud synchronization system 232 indicates 802 to the monitoring agent 220 that an updated component of a digital asset is available on the cloud synchronization system 232. In response, the monitoring agent 220 looks up 804 the component identifier. For example, the monitoring agent 220 accesses a look-up table to identify to which digital asset the updated component corresponds. Additionally, the monitoring agent 220 provides 806 the component identifier to the component manager 212.

The component manager 212, in the illustrated embodiment, uses the component identifier to retrieve 808 the updated component from the cloud synchronization system 232. For example, the component manager 212 pulls the updated component from the cloud synchronization system 232, as described above. Upon downloading the updated component, the component manager 212 temporarily stores the updated component in the component database.

In some embodiments, one or more conflicts arise between components of the digital asset between the modified component retrieved by the component manager 212 and components recently updated on the client device 202. Accordingly, as shown in FIG. 8, the component manager 212 optionally resolves 810 conflicts with the digital asset. More specifically, while retrieving and updating the packaged file, another change may have been made to the same digital asset, which causes a conflict between the different versions of the digital asset. A detailed explanation with respect to resolving conflicts between the same or different components of a digital asset is provided above in connection with FIG. 2. In addition, the component manager 212 can further update and/or modify the packaged file for the digital asset on the client device 202 during the resolution process, as described above.

In embodiments where the component manager 212 resolves conflicts between components of the digital asset, the component manager 212 again synchronizes 812 the resolved components with the cloud synchronization system 232. As described above, upon synchronizing, the component manager 212 can verify that the version on the cloud synchronization system 232 matches the version on the client device 202 (e.g., the cloud branch and the local branch match). If the cloud synchronization system 232 includes additional modifications, the digital asset synchronization system 210 can iteratively retrieve and incorporate the additional modifications, as previously described.

After component conflicts are resolved, and the components are synchronized with the cloud synchronization system 232, the component manager (and/or packaging manager) creates 814 an updated packaged file for the digital asset. As previously described, the component manager 212 and/or the packaging manager (not shown) appends the modified component to the existing packaged file or generates a new packaged file. Upon updating the packaged file for the digital asset, the component manager 212 stores 816 the packaged file for the digital asset in the monitored file directory. The component manager 212 can also remove the modified component from the component database.

FIG. 9 illustrates a sequence diagram of the digital asset synchronization system 210 opening a packaged file on the client device 202. As mentioned above, an application (e.g., application 226) is configured to correctly display a digital asset that is made of components such that the digital asset is displayed to a user as a single monolithic file. Specifically, the application communicates with the component manager 212 of the digital asset synchronization system 210 to access each component in the component database as well as indicate when user input causes modifications to a component of the digital asset.

As shown in FIG. 9, the application 226 receives 902 a request to open a digital asset. For example, a user requests that the application 226 open a packaged file for a digital asset within the application 226. As part of receiving the request to open the digital asset, the application 226 receives the mapping (e.g., file location path) of the digital asset. In some embodiments, the application includes a component sub-manager that facilitates interacting with components of a digital asset as well as communication with other elements of the digital asset synchronization system 210, as provided above.

Upon receiving the request, the application 226 determines 904 that the digital asset is made up of components. As described above, in one or more embodiments, the application 226 is configured to interact with components of a digital asset. As such, the application 226 can determine whether a synchronization system 210 is a packaged file that includes components of a digital asset or whether the digital asset is a conventional file. In some embodiments, the application 226 only interacts with digital assets that are made up of components, either stored in a packaged file or the component database.

After verifying that the digital asset is made up of components, the application 226 performs 906 a handshake with the monitoring agent 220 to receive an identifier (e.g., record id) for the digital asset. In particular, the application 226 provides the path of the digital asset to the monitoring agent 220, which looks up the record id for the digital asset and provides it back to the application 226. In various embodiments, a component interaction interface (e.g., a component sub-manager) within the application 226 can employ an IPC with the monitoring agent 220 to initiate the handshake.

Additionally, by performing the handshake with the monitoring agent 220, the monitoring agent 220 is notified that the application 226 is accessing the digital asset. As such, the monitoring agent 220 can inform the component manager 212 to communicate with the application 226 to implement changes to components of the digital asset. The monitoring agent 220 can also detect and report changes to the cloud synchronization system 232 as they occur to the digital asset.

In some embodiments, the monitoring agent 220 does not initially locate the record id for the digital asset. For example, the digital asset is new and not yet registered with the monitoring agent 220. Rather than returning a null identifier to the application 226, which would cause an opening failure in the application 226, the monitoring agent 220 calls the function to create a new packaged file for a digital asset, as described with respect to FIGS. 3 and 4. Thus, if the packaged file exists, the monitoring agent 220 will recognize the digital asset and work with the component manager 212 to register the digital asset. The monitoring agent 220 then returns the newly allocated digital asset identifier to the application 226. If not, the monitoring agent 220 returns a null identifier, as described above.

Using the identifier for the digital asset, the application 226 accesses 908 the components in connection with the component manager 212. For example, while the application 226 loads the components from the packaged file for the digital asset, the application 226 also communicates with the component manager 212 to indicate when a user performs changes to one or more components of the digital asset. In this manner, and as previously described, the component manager 212 (and/or the packaging manager) can update the packaged file to reflect the received modifications.

In addition, the application 226 displays 910 the digital asset to the user as a monolithic file. As recently mentioned, the application 226 loads the components from the packaged file for the digital asset and provides the digital asset to the user as a single file. In some embodiments, the application 226 enables the user to show/hide individual components or view hidden components (e.g., components that include metadata for the digital asset).

Turning now to FIGS. 10-12, additional examples are given regarding the digital asset synchronization system 210 deleting packaged files. In particular, FIG. 10 illustrates a user deleting a digital asset (e.g., a packaged file for the digital asset). More specifically, FIG. 10 illustrates the digital asset synchronization system 210 deleting a digital asset from the client device based on user input requesting the digital asset synchronization system 210 to remove the digital asset from the monitored file directly on the client device 202.

As shown, the monitoring agent 220 detects 1002 a removed packaged file for a digital asset. For example, a user deletes the digital asset by moving the digital asset into a trash directory. In another example, the user moves the digital asset out of the monitored file directory and into a non-monitored directory. In some embodiments, the command to remove a packaged file is triggered when the packaged file is being overwritten. For example, overwriting the digital asset first creates a new digital asset, then deletes the older digital asset, as described in connection with FIGS. 3 and 4 above.

Upon detecting the removed packaged file for the digital asset, the monitoring agent 220 reports 1004 the removed packaged file to the component manager 212. For instance, the monitoring agent 220 looks up the identifier for the digital asset and passes the digital asset identifier along with removal instructions to the component manager 212.

The component manager 212 marks 1006 the components in the packaged file for the digital asset for removal from the digital asset synchronization system 210 on the client device 202. In this manner, the component manager 212 prevents future additions or modifications from being made to the digital asset. For example, if removing a digital asset occurs during the next synchronization cycle, removal of the digital asset may not be immediate. Because of the delay in removing a file, in some embodiments, upon the component manager 212 detecting additions or other modifications to the digital asset, the component manager 212 creates a new packaged file for the digital asset, as described in FIGS. 3 and 4 above. For instance, if an application has the digital asset currently open, the component manager 212 may continue to store copies of the components of the digital asset until conflict resolution steps are complete, as described above.

In addition, the component manager 212 confirms to the monitoring agent 220 that the digital asset is a packaged file rather than a conventional file type or digital asset stored in the component database. If the digital asset is stored as a packaged file, the component manager 212 returns the digital asset identifier for the digital asset along with an indication to schedule/initiate the removal of the digital asset from the digital asset synchronization system 210. As shown, the component manager 212, upon marking the digital asset for removal, indicates 1008 the removal status to the monitoring agent 220.

Additionally, the component manager 212 provides 1010 the monitoring agent 220 with an indication to delete/archive components of the packaged file for the digital asset. In particular, the component manager 212 indicates to the cloud synchronization system 232 that the digital asset is being removed from the client device 202. As such, the cloud synchronization system 232 should store/archive the components of the packaged file for the digital asset for at least a period of time (e.g., 30 days, 6 months, 1 year) before deleting them. In this manner, a user can access and restore the digital asset, if desired. Alternatively, the cloud synchronization system 232 deletes the components upon receiving the indication from the component manager 212.

The cloud synchronization system 232 confirms deleting/archiving the components of the digital asset to the component manager 212. Upon receiving 1012 confirmation from the cloud synchronization system 232, the component manager 212 indicates 1014 to the monitoring agent 220 that the cloud synchronization system 232 successfully deleted/archived components of the digital asset. The monitoring agent 220 then deletes 1016 the packaged file for the digital asset from the monitored file directory. In addition, the component manager 212 can remove any components and/or metadata associated with the digital asset from the component database.

FIG. 11 illustrates a user deleting a digital asset that is stored as a packaged file from with an application. As shown, the application 226 display 1102 the components of a packaged file (i.e., digital asset) as a monolithic file to a user. For example, the application 226 opens and displays the digital asset as described above in connection with FIG. 9.

While the user is viewing the digital asset within the application 226, the application 226 receives 1104 a request to delete the packaged file from a user. For instance, the user selects an option within the application 226 to delete the digital asset or all the components of the packaged file. In another example, the user replaces or overwrites the packaged file with another digital asset, as described above. In response, the application 226 indicates 1106 deletion of the packaged file to the component manager 212.

Upon receiving the deletion indication, the component manager 212 marks 1108 the components for deletion. For example, the component manager 212 associates metadata with the components in the component database that marks the components for removal from the digital asset synchronization system 210. Further, the component manager 212 may schedule the packaged file for removal on the next synchronization cycle within the digital asset synchronization system 210.

As shown in FIG. 11, the component manager 212 also performs 1110 deletion/archival of the components of the packaged file for the digital asset. As described above in connection with FIG. 10, the component manager 212 indicates to the cloud synchronization system 232 that the digital asset is being removed from the client device 202. In response, the cloud synchronization system 232 stores, archives, removes, and/or deletes the components of the packaged file for the digital asset. In addition, the cloud synchronization system 232 confirms when the components have been archived. Further, as shown, the monitoring agent 220 deletes 1112 the packaged file from the monitored file directory as described above in connection with FIG. 10.

FIG. 12 illustrates the digital asset synchronization system 210 receiving an indication that a packaged file (i.e., digital asset) has been deleted from the cloud synchronization system 232. For example, a user deletes the packaged file on another client device, which then synchronizes with the cloud synchronization system 232 and causes the cloud synchronization system 232 to archive/delete the packaged file. In turn, the cloud synchronization system 232 notifies the client device 202 of the deleted packaged file such that the digital asset synchronization system 210 on the client device 202 is instructed to remove the packaged file for the digital asset.

In particular, FIG. 12 shows the cloud synchronization system 232 deleting 1202 the packaged file on the server device 230. As described above, in one or more embodiments, the cloud synchronization system 232 deletes or archives the components of the packaged file. When archiving the components associated with the digital asset, the cloud synchronization system 232 stores the components within a remote component database (at least for a period of time). In addition, the cloud synchronization system 232 also causes client devices synchronized with the cloud synchronization system 232 to delete/remove the packaged file for the digital asset, including all the components stored in the packaged file.

Upon deleting or removing the packaged file, the cloud synchronization system 232 provides 1204 an indication to the monitoring agent 220 to delete the packaged file on the client device 202. Upon receiving the indication, the monitoring agent 220 looks up 1206 the digital asset identifier for the packaged file, as previously described. As also described above, the monitoring agent 220 provides 1208 the digital asset identifier to the component manager 212 along with instructions to remove the packaged file. Further, the component manager 212 marks 1210 the components of the digital asset for deletion, as described above.

In one or more embodiments, the packaged file is actively being used by an application or otherwise on the client device 202. In these embodiments, the component manager 212 first waits to resolve 1212 conflicts with the digital asset, which includes updating the component database and/or packaged file for the digital asset. As described above, resolving conflicts may include the component manager 212 creating a new packaged file for the digital asset that includes modifications, where the modifications are detected after the component manager 212 received the instructions to delete the packaged file. In these embodiments, the component manager 212 then synchronizes 1214 the resolved components with the cloud synchronization system 232, as described above.

Upon the component manager 212 receiving instructions to mark the packaged file for deletion, the monitoring agent 220 deletes 1216 the packaged file for the digital asset. For example, as described above, the component manager 212 indicates to the monitoring agent 220 that the cloud synchronization system 232 successfully deleted/archived the digital asset. Upon which, the monitoring agent 220 then deletes the packaged file for the digital asset from the monitored file directory. In addition, the component manager 212 can remove any components and/or metadata associated with the digital asset from the component database.

Figure 13:
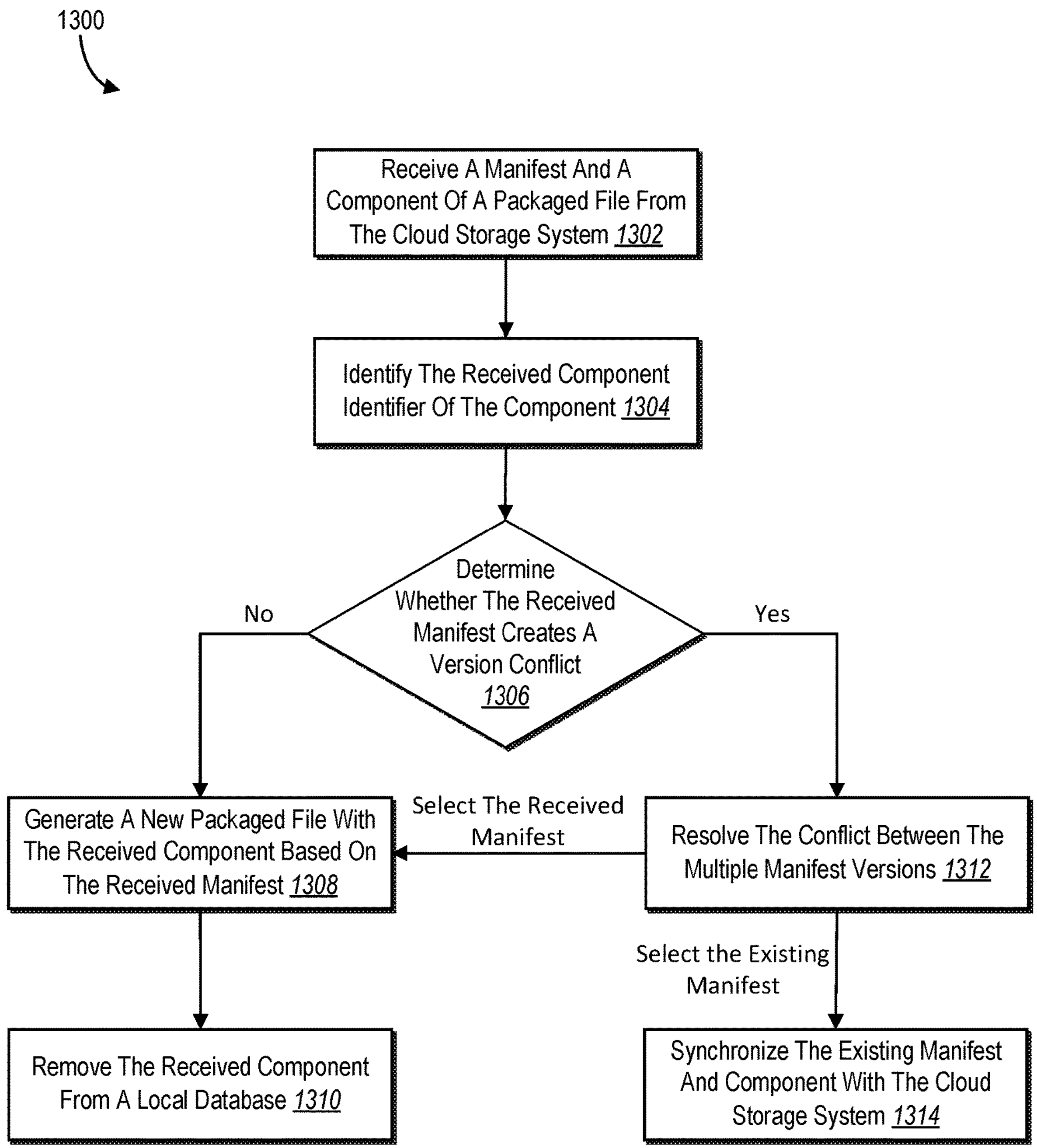
FIG. 13 illustrates a state diagram of the digital asset synchronization system maintaining the storage of one or more components of a digital asset between a component database and a packaged file in accordance with one or more embodiments.

FIG. 13 illustrates a state diagram 1300 of the digital asset synchronization system 210 performing, on a client device, a step for maintaining storage of the subset of components between a component database and a packaged file. The component database comprises components that are stored as independent files across the client device. For explanatory purposes, reference will be made to the digital asset synchronization system 210, the cloud synchronization system 232, and the client device 202 described above. Further, the description of FIG. 13 references the above description figures with respect to steps, actions, operations, and/or functions performed by the digital asset synchronization system 210.

As shown, the digital asset synchronization system 210 receives 1302 a manifest and component of a packaged file from the cloud synchronization system 232 (e.g., the received manifest indicates the component). For example, the digital asset synchronization system 210 requests, pulls, and/or downloads one or more components of a digital asset (indicated in the received manifest of a packaged file) from the cloud synchronization system 232, as described above. Alternatively, the cloud synchronization system 232 sends or pushes the one or more components to the digital asset synchronization system 210 on a client device 202.

As a note, the description of FIG. 13 describes the digital asset synchronization system 210 receiving a single component from the cloud synchronization system 232 in connection with a received manifest. One will appreciate that the cloud synchronization system 232 can provide additional components. The intent, however, is that the cloud synchronization system 232 provides a less than all the components of a digital asset (e.g., only modified components that changed from a previous manifest). In other words, as described below, the digital asset synchronization system 210 creates a new packaged file for a digital asset when less than all of the components (i.e., a subset) are received for an existing digital asset that is stored as a packaged file of components that make up the digital asset.

Next, the digital asset synchronization system 210 identifies 1304 the component identifier of the received component. For example, the digital asset synchronization system 210 looks up an identifier for the received component from within the manifest. In some embodiments, the digital asset synchronization system 210 allocates a new local component identifier for the received component. In addition, the digital asset synchronization system 210 looks up a digital asset identifier (e.g., record id) for the digital asset to which the received manifest and component belongs.

The digital asset synchronization system 210 determines whether the received manifest indicates a different version of a particular digital asset. For example, the digital asset synchronization system 210 determines that the received manifest of the digital asset includes a new component or a modified version of a component (e.g., the received component) than is included in the existing manifest located on the client device 202. When the digital asset synchronization system 210 detects different manifests (i.e., versions) for the same digital asset between the received manifest and the existing manifest on the client device 202, as shown in FIG. 13, the digital asset synchronization system 210 determines 1306 whether the received manifest creates a version conflict for the digital asset.

If the received manifest does not create a version conflict (e.g., the received manifest provides an update to the existing manifest locating on the client device 202), then the digital asset synchronization system 210 generates 1308 a new packaged file with the received component based on the received manifest. For example, the digital asset synchronization system 210 generates a new packaged file or appends the received component to an existing packaged file for the digital asset. Description regarding the digital asset synchronization system 210 generating a new packaged file is specified above in connection with FIGS. 2-5. Additionally, and/or alternatively, the digital asset synchronization system 210 employs actions provided in FIGS. 6-8 where the digital asset synchronization system 210 updates a packaged file for a digital asset based on a component of the digital asset being modified.

Upon generating a new packaged file for a digital asset, the digital asset synchronization system 210 removes 1310 the received component from a local database. In particular, the digital asset synchronization system 210 removes the received component from the component database. As described above at least in connection with FIG. 2 and FIG. 7, the digital asset synchronization system 210 temporarily stores the received component within a component database upon receiving the component until the received component is successfully packaged within an updated or new packaged file for the digital asset.

If the digital asset synchronization system 210 determines that the received manifest conflicts with the existing manifest on the client device for the digital asset (e.g., a corresponding component has been modified on the client device 202 before receiving the received component, but not synchronized with the cloud synchronization system 232), the digital asset synchronization system 210 resolves 1312 the conflict between the multiple manifest versions (e.g., the received manifest and the existing manifest on the client device 202, which is not yet synchronized with the cloud synchronization system 232). For example, the digital asset synchronization system 210 employs the actions described above in connection with FIG. 2 to resolve the conflict between the different manifest versions of the digital asset. As part of resolving the component conflict and as shown, the digital asset synchronization system 210 can select the received manifest indicating the use of the received component and generate 1308 a new packaged file with the received component, as described above.

Alternatively, the digital asset synchronization system 210 selects the existing manifest and synchronizes 1314 the existing manifest and corresponding component (e.g., the component updated on the client device 202) with the cloud synchronization system 232, which lacks the copy of the existing manifest and/or component. In other embodiments, the digital asset synchronization system 210 merges one or more corresponding components for the two different manifest versions to include in a new manifest of the packaged file. In these embodiments, the digital asset synchronization system 210 would still synchronize the existing component with the cloud synchronization system 232, as the existing component is not yet stored in the cloud synchronization system 232. Further, the digital asset synchronization system 210 synchronizes an updated mapping indicating that both the received component and the existing component have been added to the updated packaged file for the digital asset.

FIGS. 1-13, the corresponding text, and the examples provide a number of different systems and devices of the digital asset synchronization system in accordance with one or more embodiments. In addition to the above description, one or more embodiments can also be described in terms of flowcharts comprising acts in a method for accomplishing a particular result. For example, FIGS. 14 and 15 illustrate flowcharts of exemplary methods in accordance with one or more embodiments described herein.

Figure 14:
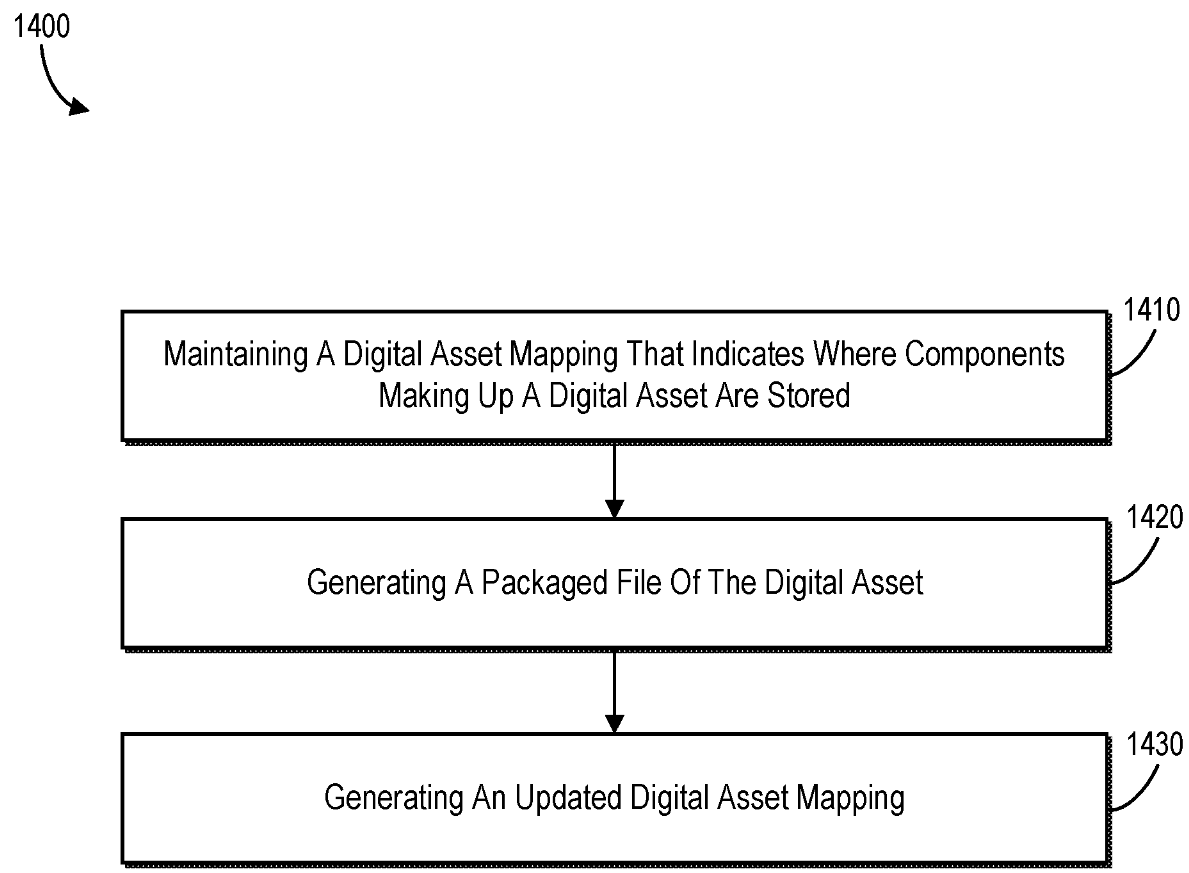
FIG. 14 illustrates an example flow diagram of a method for generating a packaged file from components of a digital asset that are stored as independent files in accordance with one or more embodiments.
Figure 15:
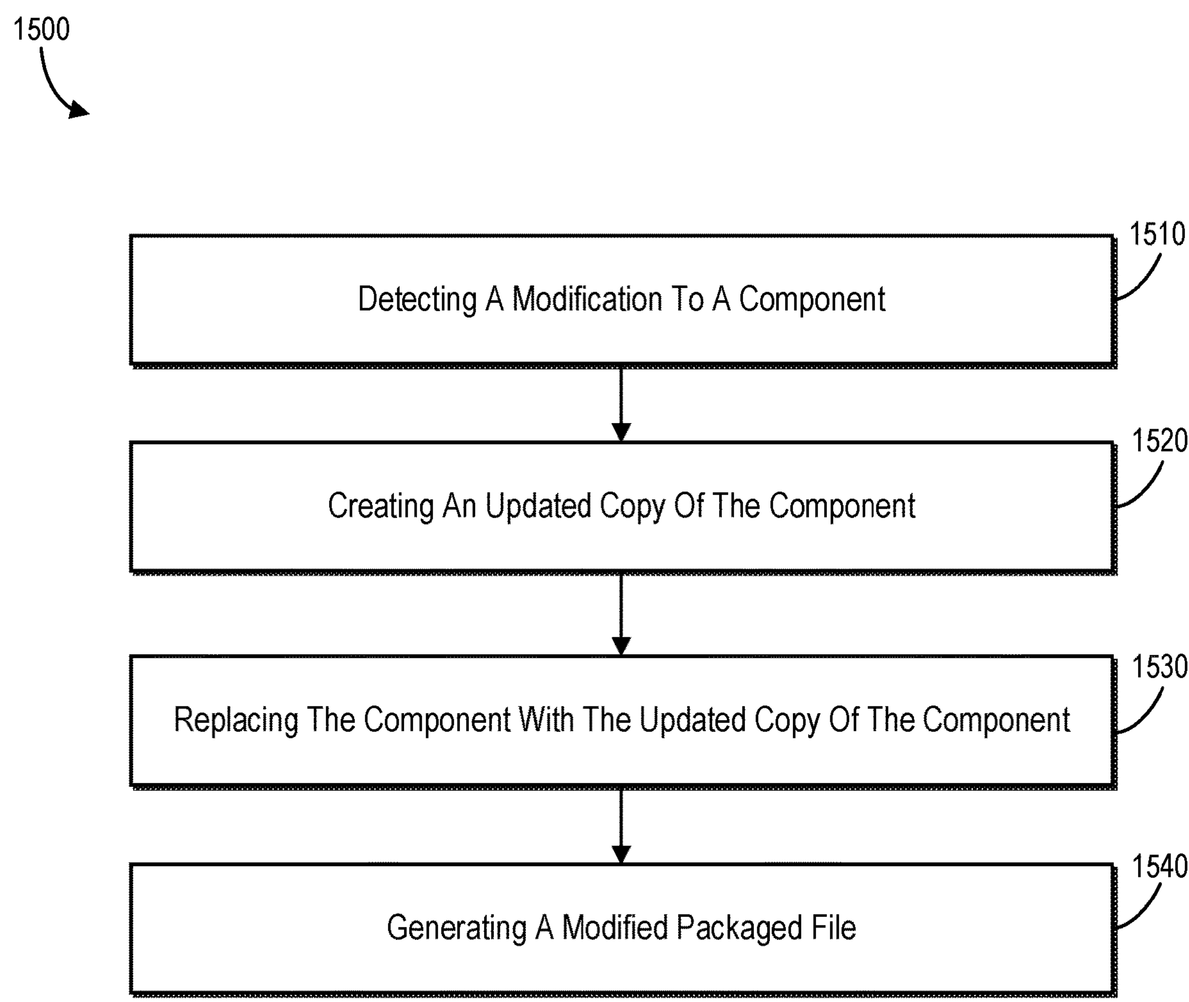
FIG. 15 illustrates an example flow diagram of a method for generating a modified packaged file in accordance with one or more embodiments.

FIG. 14 illustrates an example flow diagram of a method 1400 for generating a packaged file from components of a digital asset that are stored as independent files. In one or more embodiments, the method 1400 is implemented on one or more computing devices, such as a client device and/or a server device. Further, in some embodiments, the method 1400 is implemented in a digital environment for performing digital asset management between a computing device and a cloud storage medium.

The method 1400 includes an act 1410 of maintaining a digital asset mapping that indicates where components 216 making up a digital asset are stored. For example, the act 1410 includes maintaining, on a client device 202, a database 214 having a digital asset mapping that indicates where components 216 making up a digital asset are stored within the database 214, where the components 216 are stored as independent files distributed across the database 214 (and/or client device 202). In some embodiments, the act 1410 also includes generating a digital asset manifest that associates the components to the digital asset. In addition, the database can include one or more previous digital asset manifests of the digital asset, where each previous digital asset manifest corresponds to a previous version of the digital asset, and where one or more components corresponding to previous versions of the digital asset are maintained on a cloud storage device 230.

The method 1400 also includes an act 1420 of generating a packaged file 100 of the digital asset 102. In particular, the act 1420 can involve generating, on the client device 202, a packaged file 100 of the digital asset 102 that comprises a copy of each of the components 104 within the packaged file 100. In one or more embodiments, the act 1420 further includes synchronizing the components 104 of the digital asset 102 and the digital asset manifest on a cloud storage device 230 before generating the packaged file 100 of the digital asset 102. In some embodiments, generating the packaged file of the digital asset includes compressing each of the components of the digital asset into the packaged file.

As shown in FIG. 14, the method 1400 further includes an act 1430 of generating an updated digital asset mapping. In particular, the act 1430 can involve generating an updated digital asset mapping to reference the components 104 of the digital asset 102 within the packaged file 100. In some embodiments, the act 1430 includes associating the updated mapping of the digital asset within the generated packaged file. Additionally, and/or alternatively, the act 1430 involves including other/additional metadata within the generated packaged file.

The method 1400 can also include a number of additional acts. In some embodiments, the method 1400 also includes an act of removing the components 216 that are stored as independent files distributed across the database 214. In particular, this act can involve removing, after updating the digital asset mapping, the components 216 that are stored as independent files distributed across the database 214 (and/or client device 202). In some embodiments, this act includes deleting duplicative components within a component database that are also included in the packaged file.

In one or more embodiments, the method 1400 includes the acts of detecting a modification to a component of the digital asset; storing, in the database and in response to detecting the modification to the component, an updated copy of the component that includes the detected modifications to the component; modifying the packaged file of the digital asset to include the updated copy of the component; and removing the updated copy of the component from the database upon modifying the packaged file. The method can further include the acts of replacing, within the digital asset manifest, an identifier associating the component with the digital asset with an identifier associating the updated copy of the component with the digital asset; and updating, upon modifying the packaged file, the modified digital asset mapping to reflect the updated copy of the component being stored as part of the modified packaged file.

In some embodiments, the method 1400 includes the act of detecting the modification to the component of the digital asset based on receiving the updated copy of the component from the cloud storage device. Additionally, the method 1400 includes the acts of synchronizing the updated copy of the component with the cloud storage device before modifying the packaged file of the digital asset without synchronizing other unmodified components of the digital asset, and removing the updated copy of the component from the database after performing the synchronization.

In various embodiments, the act of modifying the packaged file of the digital asset to include the updated copy of the component further involves generating an additional packaged file of the digital asset that includes the updated copy of the component in place of the component and removing the packaged file from the client device. In alternative embodiments, the above act further involves appending a compressed copy of the updated copy of the component to the packaged file to create the modified packaged file and removing the packaged file from the client device upon creating the modified packaged file including removing the component from the client device.

The method 1400, in one or more embodiments, includes the act of determining to generate an additional packaged file based on a redundancy threshold being exceeded. For example, the redundancy threshold is exceeded when the packaged file includes a threshold amount (e.g., number) of outdated components as a result of appending one or more modified components to the packaged file. In some embodiments, the threshold amount is a data-size ratio or number ratio of outdated components to current components.

In various embodiments, the method 1400 includes the act of monitoring digital assets located in a monitored file directory of the client device. In these acts, each of the digital assets within the monitored file directory is registered to the database. Further, each of the digital assets within the monitored file directory is synchronized with the cloud storage device.

FIG. 15 illustrates an example flow diagram of a method 1500 for generating a modified packaged file. In one or more embodiments, the method 1500 is implemented on one or more computing devices, such as a client device and/or a server device. For example, the method 1500 is implemented on a client device 202 that has a database 214 storing a manifest 218 that identifies components 104 making up a digital asset 102. In particular, each of the components 104 of the digital asset 102 is stored in a packaged file 100. In addition, each component has a pre-defined boundary within the digital asset that is modifiable without affecting other components of the digital asset.

As shown, the method 1500 includes an act 1510 of detecting a modification to a component. In particular, the act 1510 can include detecting a modification to a component of the digital asset 102. In one or more embodiments, the act 1510 includes detecting the modification to the component of the digital asset at an application 226 located on the client device 202, where the application displays the packaged file of the digital asset as a monolithic file. In various embodiments, the act 1510 includes receiving, from the application, an inter-process communication (IPC) indicating that one or more components of the digital asset have been modified.

The method 1500 also includes an act 1520 of creating an updated copy of the component. In particular, the act 1520 can involve creating, in the database 214 and in response to detecting the modification to the component, an updated copy of the component that includes the detected modifications to the component. In some embodiments, the act 1520 includes sending the updated copy of the component to a cloud storage device upon creating the updated copy of the component.

In addition, the method 1500 includes an act 1530 of replacing the component with the updated copy of the component. In particular, the act 1530 can involve replacing, in the manifest, an identifier associating the component with the digital asset with an identifier associating the updated copy of the component with the digital asset. In some embodiments, replacing the identifier also includes modifying the mapping associated with updated copy of the component.

Further, the method 1500 includes an act 1540 of generating a modified packaged file. In particular, the act 1540 can involve generating a modified packaged file of the digital asset 102 that includes the updated copy of the component. In one or more embodiments, the act 1540 involves replacing an older packaged file with a newly generated packaged file. In some embodiments, the act 1540 involves appending the updated copy of the component to the packaged file.

The method 1500 can also include a number of additional acts. In one or more embodiments, the method 1500 also includes an act of removing the updated copy of the component. In particular, this act can involve removing the updated copy of the component from the database 214 upon generating the modified packaged file. In one or more embodiments, this act involves synchronizing the updated copy of the component of the digital asset and the modified manifest on a cloud storage device before generating the modified packaged file.

In some embodiments, the method 1500 also includes the acts of displaying the digital asset as a monolithic file within a first application based on the first application accessing the packaged file of the digital asset; indicating, to the first application, that the digital asset has been modified by a second application, which causes the first application to access the modified packaged file; and updating the display within the first application to display the modified digital asset based on the first application accessing the modified packaged file. In addition, the display is automatically updated without user interaction.

The term "digital environment," as used herein, generally refers to an environment implemented, for example, as a stand-alone application (e.g., a personal computer or mobile application running on a computing device), as an element of an application, as a plug-in for an application, as a library function or functions, as a server device, and/or as a cloud-computing system. A digital medium environment allows the digital asset synchronization system to perform digital asset management and synchronization between and across computing devices.

Embodiments of the present disclosure may include or utilize a special-purpose or general-purpose computer including computer hardware, such as, for example, one or more processors and system memory, as discussed in additional detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media accessible by a general-purpose or special-purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can include at least two distinctly different kinds of computer-readable media: non-transitory computer-readable storage media (devices) and transmission media.

Non-transitory computer-readable storage media (devices) includes RAM, ROM, EEPROM, CD-ROM, solid state drives, Flash memory, phase-change memory, other types of memory, other optical disk storage, magnetic disk storage or other magnetic storage devices, or any other medium used to store desired program code means in the form of computer-executable instructions or data structures, and accessible by a general-purpose or special-purpose computer.

Computer-executable instructions include, for example, instructions and data which, when executed by a processor, cause a general-purpose computer, special-purpose computer, or special-purpose processing device to perform a certain function or group of functions. In some embodiments, a general-purpose computer executes computer-executable instructions to turn the general-purpose computer into a special-purpose computer implementing elements of the disclosure. The computer executable instructions may be, for example, binaries, intermediate format instructions such as assembly language, or even source code. Although the subject matter has been described in language specific to structural features and/or methods, it is to be understood that the subject matter defined in the appended claims is not necessarily limited to the described features or acts described above. Rather, the described features and acts are disclosed as example forms of implementing the claims.

Figure 16:
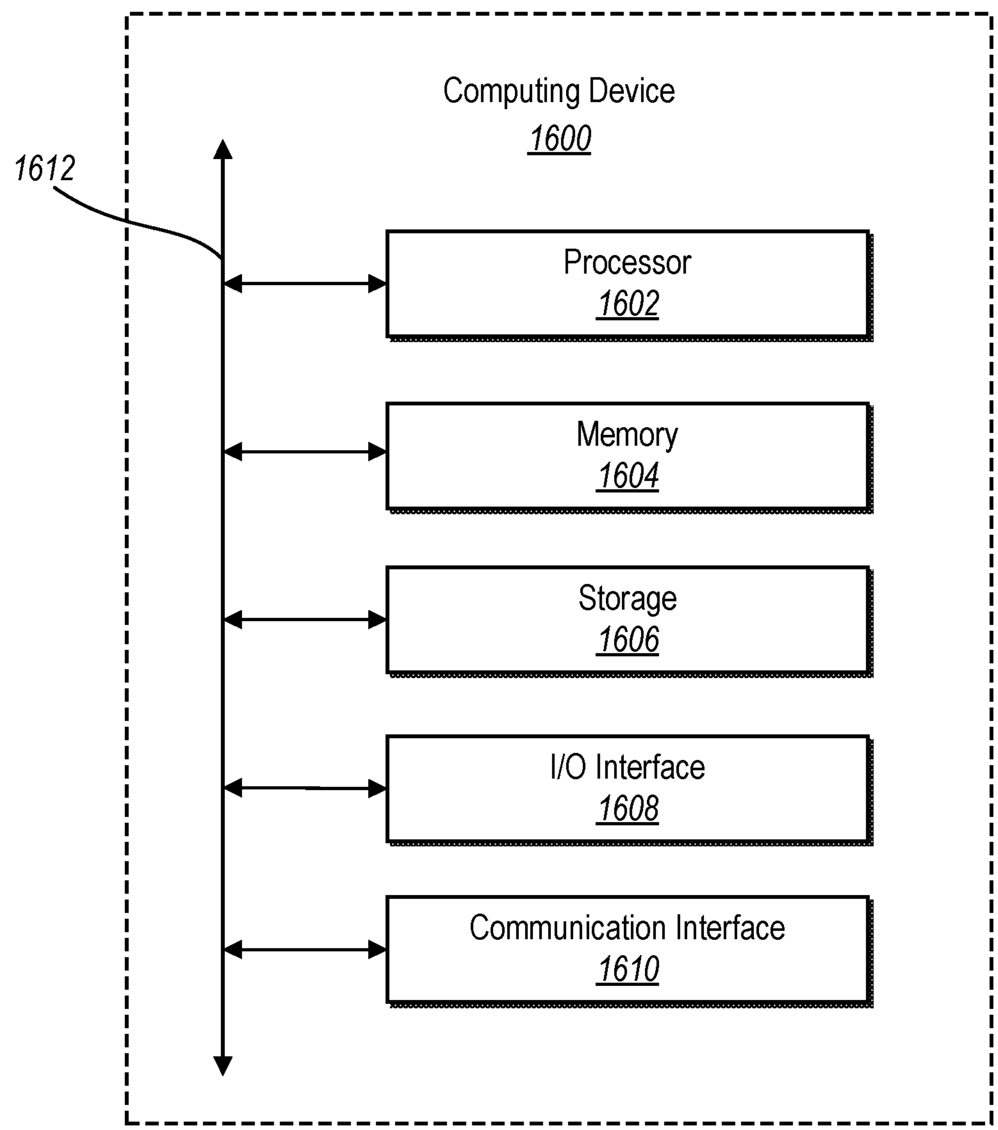
FIG. 16 illustrates a block diagram of an exemplary computing device in accordance with one or more embodiments.

FIG. 16 illustrates a block diagram of an exemplary computing device 1600 that may be configured to perform one or more of the processes described above. One will appreciate that one or more computing devices, such as the computing device 1600 may represent the client devices and server devices described above. In one or more embodiments, the computing device 1600 may be a mobile device (e.g., a mobile telephone, a smartphone, a PDA, a tablet, a laptop, a camera, a tracker, a watch, a wearable device, etc.). In some embodiments, the computing device 1600 may be a non-mobile device (e.g., a desktop computer or another type of client device). Further, the computing device 1600 may be a server device that includes cloud-based processing and storage capabilities.

As shown in FIG. 16, the computing device 1600 can include one or more processor(s) 1602, memory 1604, a storage device 1606, input/output ("I/O") interfaces 1608, and a communication interface 1610, which may be communicatively coupled by way of a communication infrastructure (e.g., bus 1612). While the computing device 1600 is shown in FIG. 16, the components illustrated in FIG. 16 are not intended to be limiting. Additional or alternative components may be used in other embodiments. Furthermore, in certain embodiments, the computing device 1600 includes fewer components than those shown in FIG. 16. Components of the computing device 1600 shown in FIG. 16 will now be described in additional detail.

In particular embodiments, the processor(s) 1602 includes hardware for executing instructions, such as those making up a computer program. As an example, and not by way of limitation, to execute instructions, the processor(s) 1602 may retrieve (or fetch) the instructions from an internal register, an internal cache, memory 1604, or a storage device 1606 and decode and execute them.

The computing device 1600 includes memory 1604, which is coupled to the processor(s) 1602. The memory 1604 may be used for storing data, metadata, and programs for execution by the processor(s). The memory 1604 may include one or more of volatile and non-volatile memories, such as Random Access Memory ("RAM"), Read-Only Memory ("ROM"), a solid-state disk ("SSD"), Flash, Phase Change Memory ("PCM"), or other types of data storage. The memory 1604 may be internal or distributed memory.

The computing device 1600 includes a storage device 1606 includes storage for storing data or instructions. As an example, and not by way of limitation, the storage device 1606 can include a non-transitory storage medium described above. The storage device 1606 may include a hard disk drive (HDD), flash memory, a Universal Serial Bus (USB) drive or a combination these or other storage devices.

As shown, the computing device 1600 includes one or more I/O interfaces 1608, which are provided to allow a user to provide input to (such as user strokes), receive output from, and otherwise transfer data to and from the computing device 1600. These I/O interfaces 1608 may include a mouse, keypad or a keyboard, a touch screen, camera, optical scanner, network interface, modem, other known I/O devices or a combination of such I/O interfaces 1608. The touch screen may be activated with a stylus or a finger.

The I/O interfaces 1608 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1608 are configured to provide graphical data to a display for presentation to a user. The graphical data may be representative of one or more graphical user interfaces and/or any other graphical content as may serve a particular implementation.

The computing device 1600 can further include a communication interface 1610. The communication interface 1610 can include hardware, software, or both. The communication interface 1610 provides one or more interfaces for communication (such as, for example, packet-based communication) between the computing device and one or more other computing devices or one or more networks. As an example, and not by way of limitation, communication interface 1610 may include a network interface controller (NIC) or network adapter for communicating with an Ethernet or other wire-based network or a wireless NIC (WNIC) or wireless adapter for communicating with a wireless network, such as a WI-FI. The computing device 1600 can further include a bus 1612. The bus 1612 can include hardware, software, or both that couples components of computing device 1600 to each other.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:

storing, on a user client device, a local digital image layer database having a digital image mapping that indicates where digital image layers making up a digital image are locally stored within the local digital image layer database on the user client device;

generating a digital image manifest that associates the digital image layers to the digital image;

synchronizing the digital image layers of the digital image and the digital image manifest on a cloud storage device;

generating, on the user client device, a packaged digital image file from the digital image layers by copying the digital image layers making up the digital image, wherein a first digital image layer from among the digital image layers comprises different components from a second digital image layer from among the digital image layers;

displaying, on the user client device, the digital image by opening the packaged digital image file;

receiving a user interaction modifying the digital image;

storing, in the local digital image layer database on the user client device and in response to the user interaction modifying the digital image, one or more modified digital image layers from among the digital image layers by replacing one or more copied digital image layers with the one or more modified digital image layers;

updating, in the local digital image layer database on the user client device, the packaged digital image file according to the user interaction to include the one or more modified digital image layers without replacing other copied digital image layers corresponding to one or more unmodified digital image layers; and removing, after updating the digital image mapping, the replaced one or more copied digital image layers that are stored as independent files distributed across the local digital image layer database from the local digital image layer database.

2. The computer-implemented method of claim 1, wherein synchronizing the digital image layers of the digital image and the digital image manifest on the cloud storage device comprises synchronizing the digital image layers and the digital image manifest before generating the packaged digital image file.

3. The computer-implemented method of claim 2, further comprising:

storing the one or more modified digital image layers in the local digital image layer database;

replacing, within the digital image manifest and after storing the one or more modified digital image layers, an identifier associating the one or more copied digital image layers with the digital image with an identifier of the one or more modified digital image layers; and updating, upon modifying of the digital image, the digital image mapping to reflect the one or more modified digital image layers being stored as part of the packaged digital image file.

4. The computer-implemented method of claim 1, further comprising receiving the user interaction via an application executed on the user client device, wherein the application displays the digital image as a monolithic image.

5. The computer-implemented method of claim 4, further comprising receiving, from the application, an inter-process communication indicating that one or more digital image layers of the digital image have been modified.

6. The computer-implemented method of claim 1, wherein receiving the user interaction modifying the digital image comprises receiving an editing action modifying a subset of the digital image layers.

7. The computer-implemented method of claim 1, further comprising:

synchronizing the one or more modified digital image layers of the packaged digital image file with the cloud storage device without synchronizing the one or more unmodified digital image layers; and based on synchronizing the one or more modified digital image layers with the cloud storage device, removing the updated packaged digital image file from the local digital image layer database.

8. The computer-implemented method of claim 1, wherein:

the local digital image layer database contains one or more previous digital image manifests of the digital image;

each previous digital image manifest corresponds to a previous version of the digital image; and one or more local digital image layers corresponding to previous versions of the digital image are maintained on the cloud storage device.

9. A non-transitory computer readable medium storing instructions that, when executed by at least one processor, cause a computing device to perform operations comprising:

storing, on a user client device, a local digital image layer database having a digital image mapping that indicates where digital image layers making up a digital image are locally stored within the local digital image layer database on the user client device;

generating a digital image manifest that associates the digital image layers to the digital image;

synchronizing the digital image layers of the digital image and the digital image manifest on a cloud storage device;

generating, on the user client device, a packaged digital image file from the digital image layers by copying the digital image layers making up the digital image, wherein a first digital image layer from among the digital image layers comprises different components from a second digital image layer from among the digital image layers;

displaying, on the user client device, the digital image by opening the packaged digital image file;

receiving a user interaction modifying the digital image;

storing, in the local digital image layer database on the user client device and in response to the user interaction modifying the digital image, one or more modified digital image layers from among the digital image layers by replacing one or more copied digital image layers with the one or more modified digital image layers;

updating, in the local digital image layer database on the user client device, the packaged digital image file according to the user interaction to include the one or more modified digital image layers without replacing other copied digital image layers corresponding to one or more unmodified digital image layers; and removing, after updating the digital image mapping, the replaced one or more copied digital image layers that are stored as independent files distributed across the local digital image layer database from the local digital image layer database.

10. The non-transitory computer readable medium of claim 9, wherein the one or more copied digital image layers are locally stored at locations on the user client device separate from the local digital image layer database on the user client device.

11. The non-transitory computer readable medium of claim 9, wherein synchronizing the digital image layers of the digital image and the digital image manifest on the cloud storage device comprises synchronizing the digital image layers and the digital image manifest before generating the packaged digital image file.

12. The non-transitory computer readable medium of claim 11, wherein the operations further comprise:

storing the one or more modified digital image layers in the local digital image layer database;

replacing, within the digital image manifest and after storing the one or more modified digital image layers, an identifier associating the one or more copied digital image layers with the digital image with an identifier of the one or more modified digital image layers; and updating, upon modifying of the digital image, the digital image mapping to reflect the one or more modified digital image layers being stored as part of the packaged digital image file.

13. The non-transitory computer readable medium of claim 9, wherein the operations further comprise:

synchronizing the one or more modified digital image layers of the packaged digital image file with the cloud storage device without synchronizing the one or more unmodified digital image layers; and based on synchronizing the one or more modified digital image layers with the cloud storage device, removing the updated packaged digital image file from the local digital image layer database.

14. The non-transitory computer readable medium of claim 9, wherein the operations further comprise:

determining that a redundancy threshold is satisfied according to a number of outdated local digital image layers within the packaged digital image file; and generating an additional packaged digital image based on determining that the redundancy threshold is satisfied.

15. The non-transitory computer readable medium of claim 14, wherein the redundancy threshold comprises a threshold ratio of outdated digital image layers to updated digital image layers.

16. The non-transitory computer readable medium of claim 9, wherein the operations further comprise monitoring digital images located in a monitored local digital image directory of the user client device, wherein each of the digital images within the monitored local digital image directory is registered to the local digital image layer database and synchronized with the cloud storage device.

17. A system comprising:

one or more computer-readable memory devices including a local digital image layer database having a digital image mapping that indicates where digital image layers making up a digital image are locally stored within the local digital image layer database on a user client device; and at least one processor coupled to the one or more computer-readable memory devices, the at least one processor configured to cause the system to:

generate a digital image manifest that associates the digital image layers to the digital image;

synchronize the digital image layers of the digital image and the digital image manifest on a cloud storage device;

generate, on the user client device, a packaged digital image file from the digital image layers by copying the digital image layers making up the digital image, wherein a first digital image layer from among the digital image layers comprises different components from a second digital image layer from among the digital image layers;

display, on the user client device, the digital image by opening the packaged digital image file;

receive a user interaction modifying the digital image;

store, in the local digital image layer database on the user client device and in response to the user interaction modifying the digital image, one or more modified digital image layers from among the digital image layers by replacing one or more copied digital image layers with the one or more modified digital image layers;

update, in the local digital image layer database on the user client device, the packaged digital image file according to the user interaction to include the one or more modified digital image layers without replacing other copied digital image layers corresponding to one or more unmodified digital image layers; and remove, after updating the digital image mapping, the replaced one or more copied digital image layers that are stored as independent files distributed across the local digital image layer database from the local digital image layer database.

18. The system of claim 17, wherein the at least one processor is further configured to cause the system to:

display the digital image as a monolithic image at the user client device within a first application based on the first application accessing the packaged digital image file;

indicate, to the first application, that the digital image has been modified by a second application, which causes the first application to access the packaged digital image file; and update the display within the first application to display the digital image based on the first application accessing the packaged digital image file, wherein the display is automatically updated without user interaction.

19. The system of claim 17, wherein the at least one processor is further configured to cause the system to:

store the one or more modified digital image layers in the local digital image layer database;

replace, within the digital image manifest and after storing the one or more modified digital image layers, an identifier associating the one or more copied digital image layers with the digital image with an identifier of the one or more modified digital image layers; and update, upon modifying of the digital image, the digital image mapping to reflect the one or more modified digital image layers being stored as part of the packaged digital image file.

20. The system of claim 17, wherein the at least one processor is further configured to cause the system to:

create, at a cloud storage database, one or more new digital image layers comprising the one or more modified digital image layers upon detecting the modifying of the digital image at the user client device;

modify, at the cloud storage database, a mapping to incorporate the one or more new digital image layers; and provide the modified mapping of the modified digital image and the one or more new digital image layers to a second user device without providing the updated packaged digital image file.

* * * * *